(12) United States Patent
Burton

(10) Patent No.: US 7,380,059 B2
(45) Date of Patent: May 27, 2008

(54) METHODS AND SYSTEMS OF CACHE MEMORY MANAGEMENT AND SNAPSHOT OPERATIONS

(75) Inventor: David Alan Burton, Vail, AZ (US)

(73) Assignee: Pillar Data Systems, Inc., San Jose, CA (US)

( * ) Notice: Subject to any disclaimer, the term of this patent is extended or adjusted under 35 U.S.C. 154(b) by 0 days.

(21) Appl. No.: 11/408,209

(22) Filed: Apr. 19, 2006

(65) Prior Publication Data

US 2006/0265568 A1 Nov. 23, 2006

Related U.S. Application Data

(63) Continuation-in-part of application No. 10/440,347, filed on May 16, 2003, now Pat. No. 7,124,243.

(51) Int. Cl.
*G06F 12/00* (2006.01)

(52) U.S. Cl. .................. 711/113; 711/114; 711/118

(58) Field of Classification Search ............... 711/113, 711/114, 118
See application file for complete search history.

(56) References Cited

U.S. PATENT DOCUMENTS

| | | | |
|---|---|---|---|
| 5,379,391 A | 1/1995 | Belsan et al. | |
| 5,542,066 A | 7/1996 | Mattson et al. | |
| 5,619,675 A | 4/1997 | De Martine et al. | |
| 5,740,399 A | 4/1998 | Mayfield et al. | |
| 5,758,119 A | 5/1998 | Mayfield et al. | |
| 5,778,426 A | 7/1998 | DeKoning et al. | |
| 5,809,560 A | 9/1998 | Schneider | |
| 5,911,779 A | 6/1999 | Stallmo et al. | |
| 6,014,730 A | 1/2000 | Ohtsu | |

(Continued)

OTHER PUBLICATIONS

Snap View Software, Maximize Information Protection and Availability to Reach New Levels of Success, Copyright 2002, pp. 1-4, EMC Corp., Sep. 2002, C806.3 Data Sheet, MA, US.

(Continued)

*Primary Examiner*—Woo H. Choi
(74) *Attorney, Agent, or Firm*—Robert Moll

(57) ABSTRACT

The present invention relates to a cache memory management system suitable for use with snapshot applications. The system includes a cache directory including a hash table, hash table elements, cache line descriptors, and cache line functional pointers, and a cache manager running a hashing function that converts a request for data from an application to an index to a first hash table pointer in the hash table. The first hash table pointer in turn points to a first hash table element in a linked list of hash table elements where one of the hash table elements of the linked list of hash table elements points to a first cache line descriptor in the cache directory and a cache memory including a plurality of cache lines, wherein the first cache line descriptor has a one-to-one association with a first cache line. The present invention also provides for a method converting a request for data to an input to a hashing function, addressing a hash table based on a first index output from the hashing function, searching the hash table elements pointed to by the first index for the requested data, determining the requested data is not in cache memory, and allocating a first hash table element and a first cache line descriptor that associates with a first cache line in the cache memory.

3 Claims, 19 Drawing Sheets

Write Command

| Byte \ Bit | 7 | 6 | 5 | 4 | 3 | 2 | 1 | 0 |
|---|---|---|---|---|---|---|---|---|
| 0 | Operation Code = '8A' x (Write) ||||||||
| 1 | Clean | Reserved || 0 | 0 | Reserved || 0 |
| 2-9 | Logical Block Address ||||||||
| 10-13 | Transfer Length ||||||||
| 14 | Commands in Group ||||||||
| 15 | Control ||||||||

U.S. PATENT DOCUMENTS

| | | | |
|---|---|---|---|
| 6,021,468 | A | 2/2000 | Arimilli et al. |
| 6,076,148 | A | 6/2000 | Kedem |
| 6,115,802 | A | 9/2000 | Tock et al. |
| 6,182,198 | B1 | 1/2001 | Hubis et al. |
| 6,216,198 | B1 | 4/2001 | Baba |
| 6,216,199 | B1 | 4/2001 | DeKoning et al. |
| 6,334,168 | B1 * | 12/2001 | Islam et al. .................. 711/113 |
| 6,341,342 | B1 | 1/2002 | Thompson et al. |
| 6,401,193 | B1 | 6/2002 | Asfar et al. |
| 6,434,681 | B1 | 8/2002 | Armangau |
| 6,460,122 | B1 * | 10/2002 | Otterness et al. ........... 711/154 |
| 6,467,025 | B1 | 10/2002 | Taylor |
| 6,598,126 | B2 | 7/2003 | Matsubara et al. |
| 6,901,477 | B2 * | 5/2005 | Sullivan ..................... 711/113 |
| 2002/0042796 | A1 | 4/2002 | Igakura |
| 2002/0073276 | A1 | 6/2002 | Howard et al. |
| 2002/0178335 | A1 | 11/2002 | Selkirk et al. |
| 2004/0230737 | A1 | 11/2004 | Burton et al. |

OTHER PUBLICATIONS

Veritas Database Edition for Oracle, Technical Overview: Storage Checkpoints for Block-Level Incremental Backup and Storage Rollback, Copyright Jun. 2000, pp. 1-25, Veritas Software Corporation, CA, US.

Richard Barker, Paul Massiglia, Storage Area Network Essentials, A Complete Guide to Understanding and Implementing SANs, Copyright 2002, pp. 224-229, 284-286, John Wiley & Sons, Inc. US and Canada.

Evan Marcus, Hal Stern, Blueprints for High Availability, Designing Resilient Distributed Systems, Copyright 2000, p. 261, John Wiley & Sons, Inc., US and Canada.

Jung-Ho Huh, Tae-Mu Chang, Hierarchical Disk Cache Management In Raid 5 Controller, JCSC 19, (Dec. 2, 2003), Copyright © 2003, pp. 47-59, CCSC: Northwestern Conference, US.

Anujan Varma and Quinn Jacobson, Destage Algorithms for Disk Arrays with Nonvolatile Caches, IEEE Transactions on Computers, Feb. 1998, pp. 1-19, Archi & Net Lab., US.

Anujan Varma and Quinn Jacobson, Destage Algorithms for Disk Arrays with Nonvolatile Caches, IEEE Transactions on Computers, Undated, pp. 1-13, Archi & Net Lab., UCSC, Santa Cruz, CA, US.

Appendix A, Theory Of Operation, Sun StorEdge Fast Write Cache Installation And User's Guide—May 1999, pp. A-1 to A-4, US.

John Hennessy and David Patterson, Computer Architecture—A Quantitative Approach (2003) pp. 705-710, San Francisco, CA, US.

\* cited by examiner

Read Command

| Bit<br>Byte | 7 | 6 | 5 | 4 | 3 | 2 | 1 | 0 |
|---|---|---|---|---|---|---|---|---|
| 0 | | | | Operation Code = '88'x (Read) | | | | |
| 1 | Prestage | Reserved | | | 0 | 0 | Reserved | 0 |
| 2 - 9 | Logical Block Address | | | | | | | |
| 10 - 13 | Transfer Length | | | | | | | |
| 14 | Reserved | | | | | | | |
| 15 | Control | | | | | | | |

FIGURE 16

Prefetch Command

| Byte \ Bit | 7 | 6 | 5 | 4 | 3 | 2 | 1 | 0 |
|---|---|---|---|---|---|---|---|---|
| 0 | Operation Code = '90'x (Prefetch) | | | | | | | |
| 1 | Reserved | | | | | | Immediate = 1 | 0 |
| 2 - 9 | Logical Block Address | | | | | | | |
| 10 - 13 | Transfer Length | | | | | | | |
| 14 | Reserved | | | | | | | |
| 15 | Control | | | | | | | |

FIGURE 17

Write Command

| Byte \ Bit | 7 | 6 | 5 | 4 | 3 | 2 | 1 | 0 |
|---|---|---|---|---|---|---|---|---|
| 0 | \multicolumn{8}{c\|}{Operation Code = '8A' x (Write)} | | | | | | | |
| 1 | Clean | Reserved | Reserved | 0 | 0 | Reserved | 0 |
| 2 - 9 | \multicolumn{8}{c\|}{Logical Block Address} | | | | | | | |
| 10 - 13 | \multicolumn{8}{c\|}{Transfer Length} | | | | | | | |
| 14 | \multicolumn{8}{c\|}{Commands in Group} | | | | | | | |
| 15 | \multicolumn{8}{c\|}{Control} | | | | | | | |

FIGURE 18

METHODS AND SYSTEMS OF CACHE MEMORY MANAGEMENT AND SNAPSHOT OPERATIONS

This application is a continuation-In-part of U.S. application Ser. No. 10/440,347, Methods and Systems of Cache Memory Management and Snapshot Operations, filed on May 16, 2003, now U.S. Pat. No. 7,124,243 B2, which is incorporated by reference herein.

BACKGROUND

The present invention relates to cache memory management and snapshot operations in a data storage system.

This application also incorporates by reference herein as follows:

U.S. application Ser. No. 10/264,603, Systems and Methods of Multiple Access Paths to Single Ported Storage Devices, filed on Oct. 3, 2002, now abandoned;

U.S. application Ser. No. 10/354,797, Methods and Systems of Host Caching, filed on Jan. 29, 2003, now U.S. Pat. No. 6,965,979 B2;

U.S. application Ser. No. 10/397,610, Methods and Systems for Management of System Metadata, filed on Mar. 26, 2003, now U.S. Pat. No, 7,216,253 B2;

U.S. application Ser. No. 10/600,417, Systems and Methods of Data Migration in Snapshot Operations, filed on Jun. 19, 2003, now U.S. Pat. No. 7,136,974 B2;

U.S. application Ser. No. 10/616,128, Snapshots of File Systems in Data Storage Systems, filed on Jul. 8, 2003, now U.S. Pat. No. 6,959,313 B2;

U.S. application Ser. No. 10/677,560, Systems and Methods of Multiple Access Paths to Single Ported Storage Devices, filed on Oct. 1, 2003, now abandoned;

U.S. application Ser. No. 10/696,327, Data Replication in Data Storage Systems, filed on Oct. 28, 2003, now U.S. Pat. No. 7,143,122 B2;

U.S. application Ser. No. 10/837,322, Guided Configuration of Data Storage Systems, filed on Apr. 30, 2004, now U.S. Pat. No. 7,216,192 B2;

U.S. application Ser. No. 10/975,290, Staggered Writing for Data Storage Systems, filed on Oct. 27, 2004;

U.S. application Ser. No. 10/976,430, Management of I/O Operations in Data Storage Systems, filed on Oct. 29, 2004, now U.S. Pat. No. 7,222,223 B2;

U.S. application Ser. No. 11/122,495, Quality of Service for Data Storage Volumes, filed on May 4, 2005;

U.S. application Ser. No. 11/245,718, A Multiple Quality of Service File System, filed on Oct. 8, 2005; and U.S. application Ser. No. 11/407,491 Management of File System Snapshots, filed Apr. 19, 2006.

A data storage system may use snapshots for backup, data mining, or testing of software programs in development. A snapshot is a usable image of the data at an instant in time. The snapshot results in two data images: (1) the original data that can be read and written by applications as soon as the snapshot is created, and (2) the snapshot that can be backed up or mined. Some techniques allow a snapshot to be modified while others create read-only images. One technique of snapshot is copy-on-write. In copy-on-write, upon getting a request to store modified data, the data storage system first copies the original data to a target storage space before permitting the modification to be written to its source storage space. The need for high data availability in data storage systems may require making frequent snapshots of data. However, frequent snapshots consume system resources such as cache memory, the internal memory bandwidth, storage device capacity and the storage device bandwidth.

SUMMARY OF THE INVENTION

The invention relates to a cache memory management system. In an embodiment, the system includes a cache memory including a cache directory including search elements and cache line descriptors and a plurality of cache lines, wherein a first cache line descriptor has a one-to-one association with a first cache line and a cache manager receives a request for data from an application and uses a search algorithm to locate a first search element that points to the first cache line descriptor.

In another embodiment, the invention relates to a method in a cache memory management system receiving a request for data from a first application, determining the requested data is not in cache memory and allocating a first search element and a first cache line descriptor that associate with a first cache line in cache memory. The method further includes the steps of staging the data from a source VLUN to the first cache line, receiving a request for the same data from a snapshot application, allocating a second search element, wherein the second search element and the first cache line descriptor associate with the same data in the first cache line in the cache memory. The method also includes the steps of receiving a request from the first application to store updated data, allocating a third search element and a second cache line descriptor that associate with a second cache line for the updated data, and writing the updated data into the second cache line. The method may further include writing the updated data from the second cache line and the data from the first cache line to one or more nonvolatile storage devices.

In another embodiment, the invention relates to a method of destaging data in a stripe in a data storage system, comprising receiving a plurality of write commands in a data storage subsystem, setting a dirty bit for each block of each write in a cache line in a host, setting a valid bit for each block of each write in the cache line in the host, locating all of the cache line descriptors for the stripe in the host, writing the data in the stripe to the data storage subsystem, acknowledging the data in the stripe is written to the data storage subsystem, and clearing the dirty bits in the host and removing the cache line descriptors in the host.

In another embodiment, the invention relates to a method of prefetching data in a data storage system, comprising receiving a read command from a host requesting data on a data storage subsystem, wherein the first read command includes a prefetch bit indicating data whose addresses are nearby the requested data, staging the requested data from the data storage subsystem to the host, and staging the nearby data to a cache of the data storage subsystem.

BRIEF DESCRIPTION OF THE DRAWINGS

FIG. 16 illustrates a modified SCSI read command.

FIG. 17 illustrates a modified SCSI prefetch command.

FIG. 18 illustrates a modified SCSI write command.

DETAILED DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is determined by reference to the claims. Each part is assigned its own part number throughout the specification and drawings.

Figure 1:
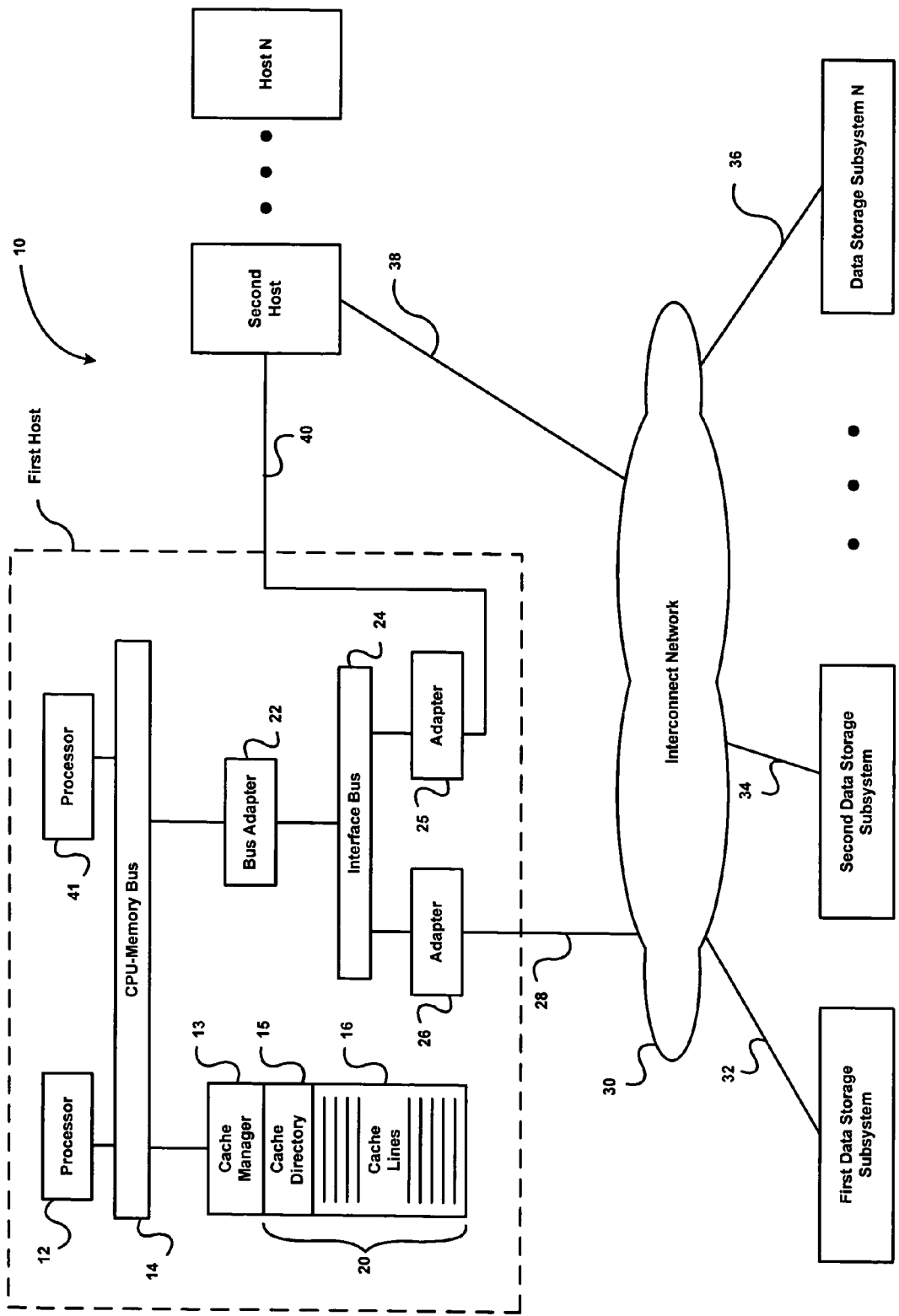
FIG. 1 illustrates an embodiment of a data storage system.

FIG. 1 illustrates a data storage system 10, including a plurality of hosts coupled to data storage subsystem(s). Each host is a computer that can connect to client(s), to data storage subsystem(s), and each other. Each host provides software/hardware interfaces such as network interface cards and software drivers to implement Ethernet, Fibre Channel, ATM, and SCSI, and InfiniBand. Hennessy and Patterson, *Computer Architecture: A Quantitative Approach* (2003), and Patterson and Hennessy, *Computer organization and Design: The Hardware/Software Interface* (1998) describe computer hardware and software, storage systems, caching, and networks and are incorporated by reference.

In an embodiment, the first host includes a motherboard with a CPU-memory bus 14 that communicates with dual processors 12 and 41. The processor used is not essential to the invention and could be any suitable processor such as the Intel Pentium 4 processor. Also, one could implement the invention using a single processor in each host or more than two processors to meet more stringent performance requirements. The arrangement of the processors is not essential to the invention.

The first host includes a cache manager 13, a cache memory 20 including a cache directory 15 and cache lines 16. The cache memory 20 is nonvolatile memory or volatile memory or a combination of both. Nonvolatile memory protects data in the event of a power interruption or a host failure. Data is defined as including user data, instructions, and metadata. Nonvolatile memory may be implemented with a battery that supplies power to the DRAM to make it nonvolatile memory when a conventional external power interrupt circuit detects a power interruption or with inherently nonvolatile semiconductor memory. Each host includes a bus adapter 22 between the CPU-memory bus 14 and an interface bus 24. Each host runs an operating system such as Linux, UNIX, a Windows OS, or another suitable operating system. Tanenbaum, *Modern Operating Systems* (2001) describes operating systems in detail and is hereby incorporated by reference. The first host is representative of the other hosts, but this feature is not essential to the invention.

The first host can communicate with the second host through an interconnect 40, shown as connected to an adapter 25 to the interface bus 24. The PCI bus is one suitable interface bus and the interconnect 40 may be any suitable known bus, SAN, LAN, or WAN technology. In an embodiment, the interconnect 40 is a dedicated Fibre Channel (FC) point-to-point link that connects to FC-PCI bus adapter 25 to provide fast point-to-point communication between the hosts.

In an alternative embodiment, the interconnect network 30 such as a FC fabric provides extra bandwidth for host-to-host communications. In this embodiment, links 28, 38 connect to the interconnect network 30 and the hosts use link 28 and link 38 when available. FC standard software can set priority levels to ensure high priority peer-to-peer requests, but there will still be some arbitration overhead and latency in claiming ownership of the links. For example, if links 28 and 38 are busy transferring data when a write request arrives, that operation must complete before either link is free for arbitration.

If the interconnect 40 ever fails, communication between hosts can be handled using the interconnect network 30. The interconnect network 30 can be implemented by interconnects used in data storage systems such as Fibre Channel, SCSI, InfiniBand, or Ethernet, and the type of interconnect is not essential to the invention. In either embodiment, redundant communication between hosts ensures the data storage system has high availability. See Clark, *IP SANs: A Guide to ISCSI, iFCP, and FCIP Protocols for Storage Area Networks* (2002) and Clark, *Designing Storage Area Networks* (1999) are incorporated herein by reference.

In an embodiment, the data storage subsystems shown in FIG. 1 can be those described in the co-pending U.S. patent application Ser. No. 10/264,603, entitled, *Systems and Methods of Multiple Access Paths to Single Ported Storage Devices*, filed on Oct. 3, 2002, and incorporated herein by reference. It is understood, however, that other storage device(s) or data storage subsystems could be used instead of the data storage subsystem described in that U.S. patent application.

As shown in FIG. 1, the first host connects, or couples, to the first data storage subsystem through the bus adapter 22, the interface bus 24, the adapter 26, the link 28, the interconnection network 30, and the link 32. To connect to the second data storage subsystem, the first host uses the same I/O path except the data passes through link 34, while the second host uses the same type of I/O components plus link 32 to communicate with the first data storage subsystem, or link 34 to communicate with the second data storage subsystem, or link 36 to the data storage subsystem N.

Each storage device in a data storage subsystem is assigned a logical unit number (LUN) that is an identifier for the storage device. A virtual logical unit number (VLUN) appears as a linear array of data blocks such as 512-byte blocks to a host. In various embodiments, the implementation of a VLUN may be striped (i.e., spread) over multiple RAID groups for added performance, spread over sections of a RAID group for flexibility, or copied on multiple RAID groups for reliability.

Figure 2:
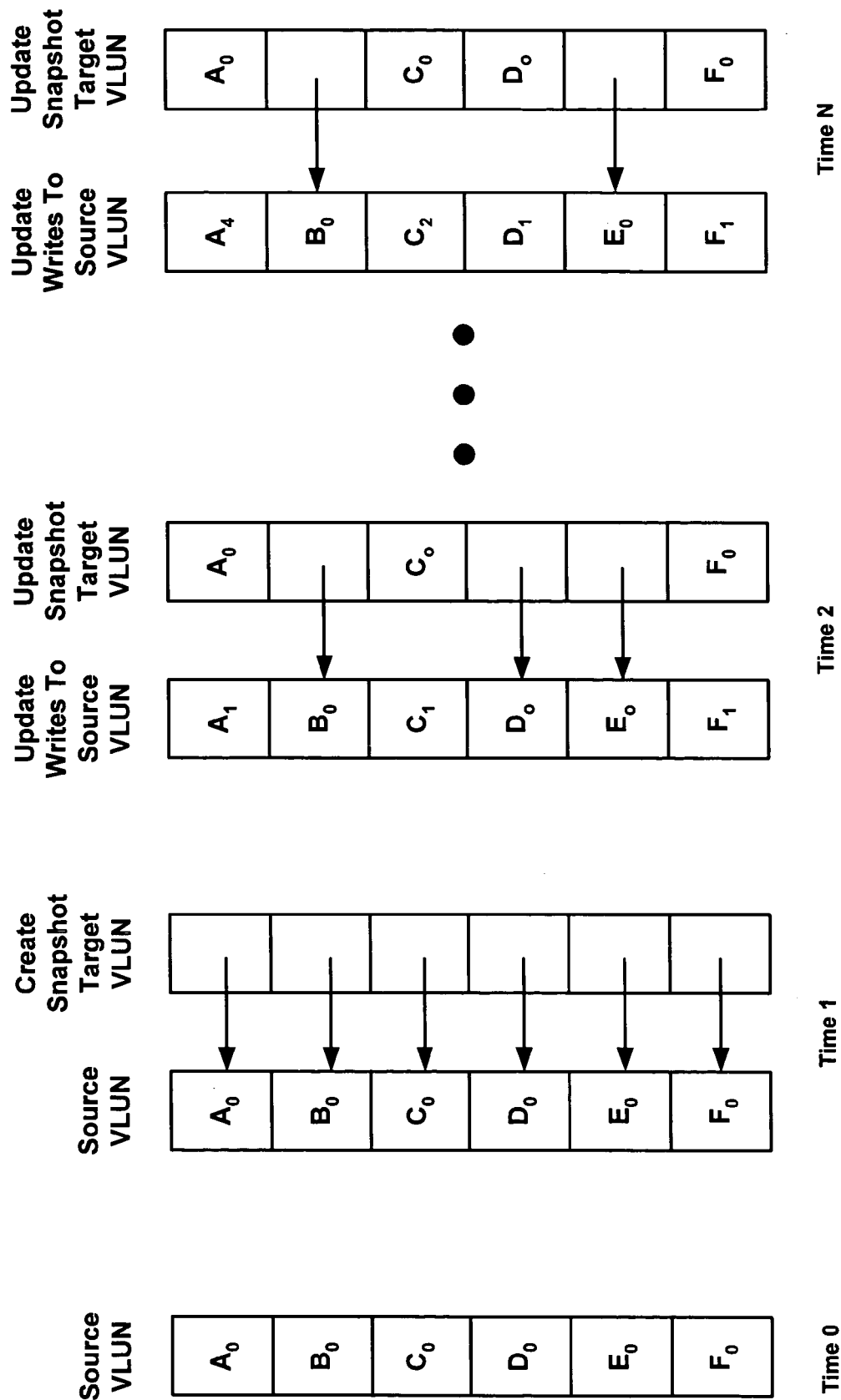
FIG. 2 illustrates the state of data in a source VLUN and a target VLUN before and during a snapshot operation.

FIG. 2 illustrates a pointer table snapshot operation and how the data storage system handles writes on the data contained in the source VLUN. The source VLUN contains the active data (e.g., data block, file, or record) and the target VLUN contains snapshot data. Letters A through F represent the data and the numerical subscript associated with each letter represents the number of writes that have been performed on the data. The invention can be implemented using other techniques of snapshot operations such as bitmaps and multilayer bitmaps.

At time 0, before creating a snapshot the source VLUN contains the data represented by $A_0$, $B_0$, $C_0$, $D_0$, $E_0$, and $F_0$. This will be referred to as the original data and is the data image preserved by the snapshot operation.

At time 1, the snapshot operation allocates space in the target VLUN and generates a map of pointers to the source VLUN. The map of pointers can be stored in any accessible memory, but is typically stored on the storage devices associated with the target VLUN. In this example, the pointers point to the original data $A_0$, $B_0$, $C_0$, $D_0$, $E_0$, and $F_0$ in the source VLUN when the snapshot is created. This preserves the original data without requiring the system to write a copy to the target VLUN that is shown in FIG. 2 as not containing any data.

Between time 1 and time 2, the data storage system receives requests to modify the data, e.g., $A_0$ to $A_1$, $C_0$ to $C_1$, and $F_0$ to $F_1$. To preserve the original data $A_0$, $C_0$, and $F_0$, the storage controller or host writes the original data to the target VLUN and drops the corresponding pointer to the source VLUN. In contrast, the storage controller or host does not modify the original data $B_0$, $D_0$, and $E_0$ as indicated by the corresponding pointers that still point to the source VLUN.

Between time 2 and time N, the data storage system receives further requests to modify certain data, for example, $A_1$ to $A_2$ to $A_3$ to $A_4$, $C_1$ to $C_2$, and $D_0$ to $D_1$. To preserve the original data $D_0$, the storage controller or host writes the original data $D_0$ to the target VLUN and drops the corresponding pointer. Although the data represented by A and C was modified several times between time 1 and time N, the target VLUN only preserves the original values, $A_0$ and $C_0$, representing the original data at the instant of the snapshot. The storage controller or host does not modify the original data $B_0$ and $E_0$ by time N so corresponding pointers to the source VLUN remain.

Figure 3:
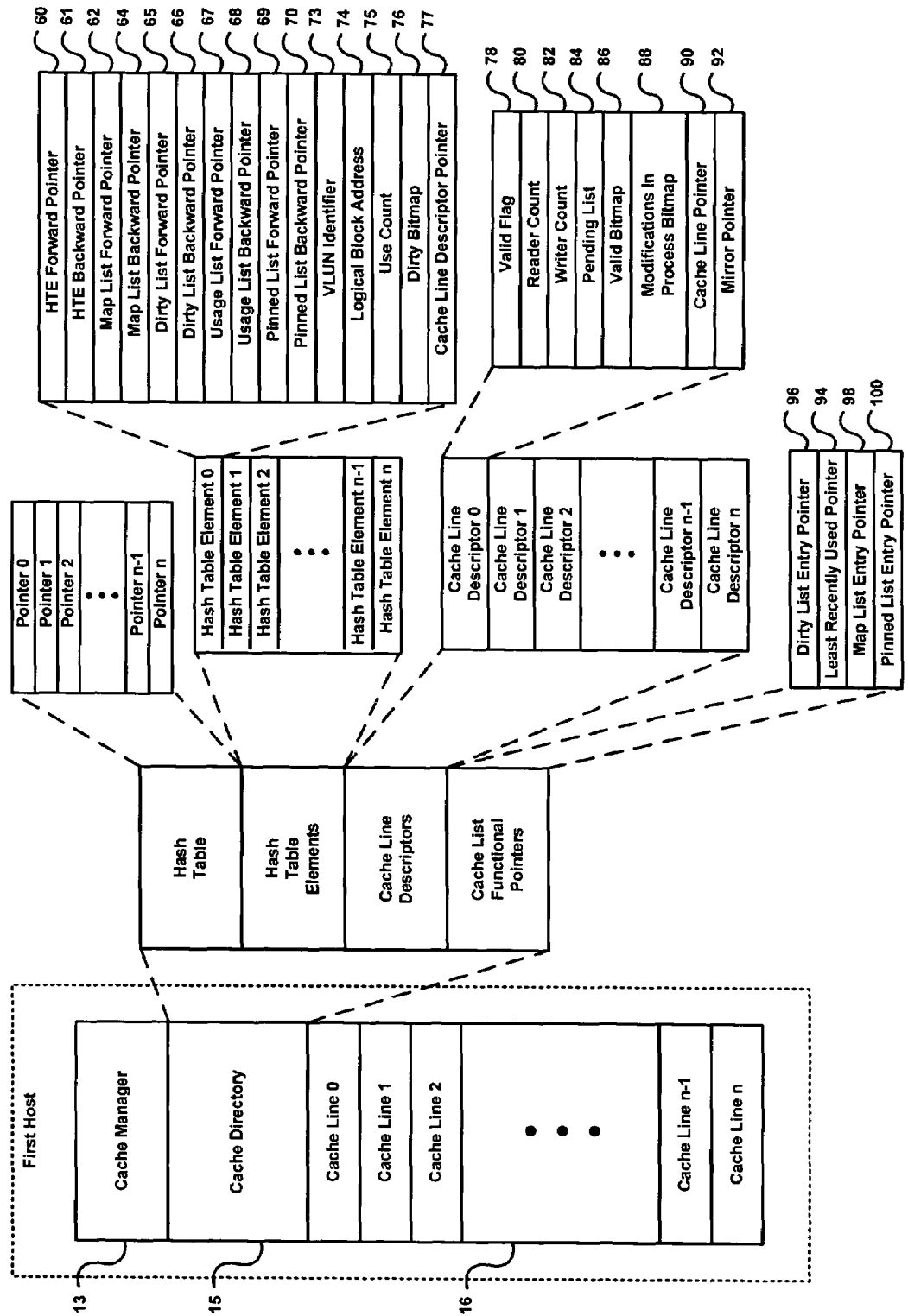
FIG. 3 is a diagram of the first host cache memory and the details of the cache directory.

FIG. 3 illustrates further details of the cache lines 16 and the cache directory 15. The cache lines 0 through n facilitate storing, searching, and retrieving of data. Each cache line is a defined space for data in cache memory. Preferably, the cache lines are of an equal size such as 64K bytes. In an embodiment, the cache directory 15 includes a search structure such as a hash table, search elements such as hash table elements 0-n, cache line descriptors 0-n, and cache list functional pointers 94, 96, 98, and 100. A hashing function not shown will take input(s) also termed a key and generate a hash value as a result that is used to index a hash table. The hash table is an array of pointers, for example, hash table pointers 0-n. The index identifies each hash table pointer by position in the hash table. A hash table pointer is used to point to a hash table element in a linked list of hash table elements referred to as a hash line.

In an embodiment, each hash table element (HTE) includes the following set of items:

An HTE forward pointer 60 that points to the next HTE in the hash line.

An HTE backward pointer 61 that points to the previous HTE in the hash line or the hash table if the HTE is the initial HTE in a hash line.

A map list forward pointer 62 that points to the next HTE in a linked list of HTEs that also point to the same cache line descriptor.

A map list backward pointer 64 that points to the previous hash table in the linked list of HTEs that also point to the same cache line descriptor.

A dirty list forward pointer 65 that points to the next HTE in a linked list of HTEs associated with dirty data. Dirty data is modified data that has not been destaged from volatile memory to nonvolatile memory.

A dirty list backward pointer 66 that points to the previous HTE in the linked list of HTEs associated with dirty data.

A usage list forward pointer 67 that points to the next HTE in a linked list of HTEs used to determine the LRU data.

A usage list backward pointer 68 that points to the previous HTE in the linked list of HTEs used to determine the LRU data.

A pinned list forward pointer 69 that points to the next HTE in a linked list of HTEs associated with dirty data whose destination VLUN(s) is not available for destaging.

A pinned list backward pointer 70 that provides a pointer to the previous HTE in the linked list of HTEs associated with dirty data whose destination VLUN(s) is not available for destaging.

A VLUN identifier 73 that provides a number of the VLUN of the data that resides in the associated cache line.

The logical block address 74 of the data in VLUN identifier 73 that resides in the associated cache line.

A use count 75 that indicates how many applications are using the data. If the use count goes to zero, the data goes on the linked list of HTEs for LRU data.

A dirty bitmap 76 that is a map of data in the cache line that has not been destaged.

A cache line descriptor pointer 77 that points to the cache line descriptor. In an embodiment, each of cache line descriptors 0-n includes the following items:

A valid flag 78 set to indicate that the VLUN and logical block address (LBA) fields are valid. If not set, the flag indicates that the present VLUN and LBA fields are invalid and the data in the cache line is not reliable data.

A reader count 80 to indicate the number of applications that are reading the associated cache line.

A writer count 82 to indicate the number of applications that are currently writing the associated cache line although not the same data.

A pending list 84 to indicate the read and write operations that are pending to the cache line, specifically to data that are already being read or written. In an embodiment, the pending list 84 is a first-in-first-out list. In another embodiment, the pending list 84 is policy based whose priority is user dependent.

A valid bitmap 86 to indicate the valid data within the cache line.

A modification in process bitmap 88 to indicate the data within the cache line that an application is modifying.

A cache line pointer 90 to point to the cache line where data is stored.

A mirror pointer 92 that points to a mirror copy of the data.

In an embodiment, the cache list functional pointers include the following items:

Dirty list entry pointer 96 points to an HTE in a linked list of HTEs that identify cache line descriptors with data that have not been destaged.

Least-recently-used pointer 94 is a pointer to the least-recently-used HTE.

Map list entry pointer 98 points to an HTE in a linked list of HTEs that point to the same cache line descriptor.

Pinned list entry pointer 100 points to an HTE in a linked list of HTEs that identifies cache line descriptors associated with dirty data that cannot be destaged.

The cache memory management system converts a request for specific data types, contained in linked lists of HTEs, to an input to a list of cache line functional pointers. The cache list functional pointers point directly to the specific linked lists of HTEs that are associated with cache lines containing the requested data, thus eliminating the need to search hash table elements whose associated cache lines do not contain the requested data.

Figure 4:
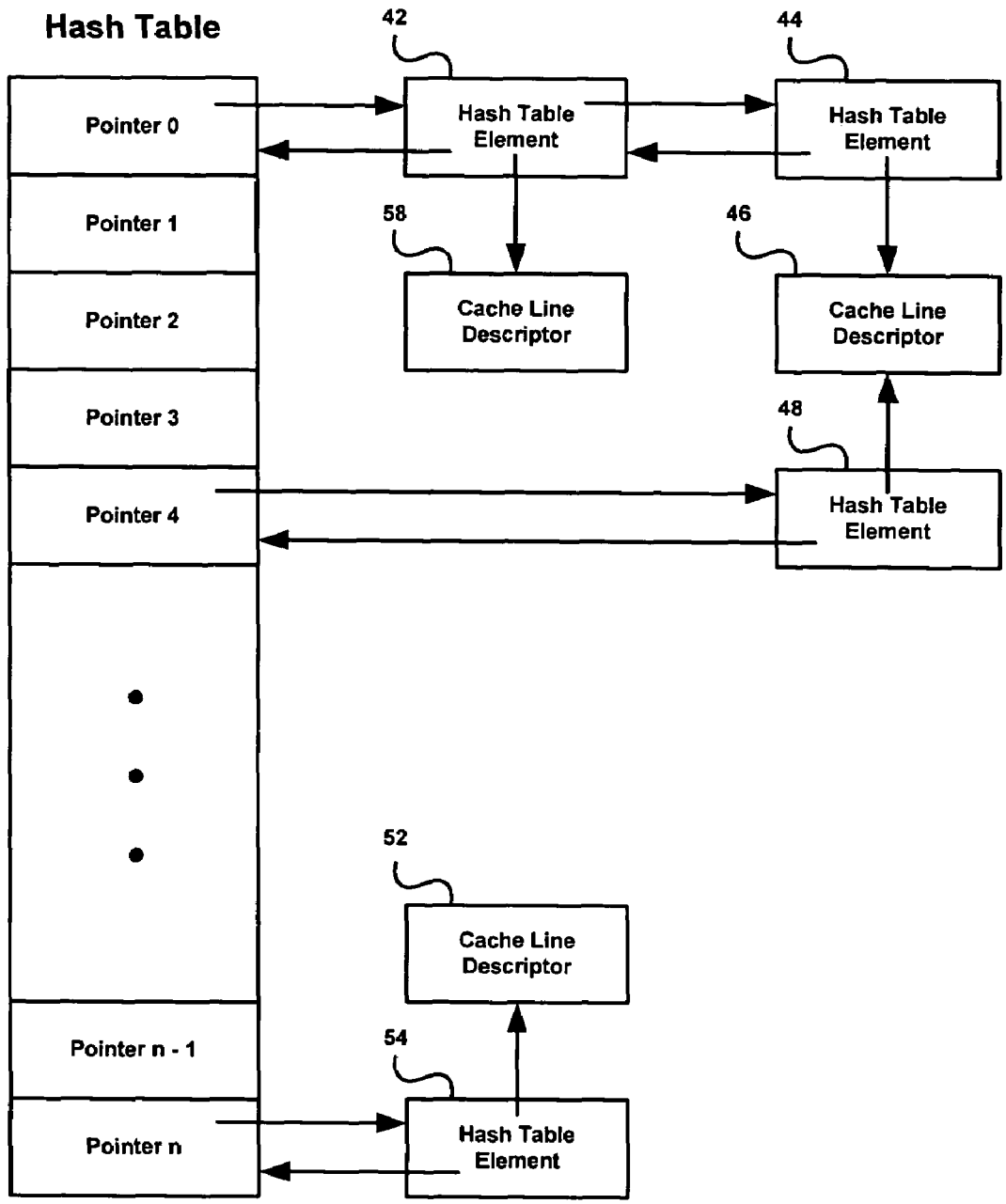
FIG. 4 illustrates details of a cache directory including a hash table and associated linked lists of hash table elements and cache line descriptors.

FIG. 4 illustrates that the cache directory 15 organizes data in cache memory so it can be rapidly retrieved and pointed to by multiple applications. The cache directory 15 includes a hash table, hash table elements (HTEs), and cache line descriptors (CLDs). The system passes a key such as a VLUN and the logical block address to a hashing function (FIG. 10) that generates a hash value that is used to index the hash table. The hash table includes an array of pointers that point to the linked lists of HTEs. For brevity, we use the symbol "—>" to represent a pointer. Each HTE includes the items 60, 61, 62, 64, 65, 66, 67, 68, 69, 70, 73, 74, 75, 76, and 77 shown in FIG. 3. As shown, the HTEs are arranged in doubly-linked lists. For example, one doubly-linked list contains a forward link of pointer 0—> HTE 42—> HTE 44 and a backward link of HTE 44—> HTE 42—> pointer 0. Similarly, another doubly-linked list contains a forward link of pointer n —> HTE 54 and a backward link of HTE 54—> pointer n. Further, multiple HTEs can point to a single CLD while each CLD points to a single cache line. For example, HTE 44 and HTE 48—> CLD 46 while HTE 42—> CLD 58 and HTE 54 —> CLD 52. Thus, each CLD associates with one or more HTEs and has a one-to-one association with a cache line in the cache memory 20 (FIG. 1).

Figure 5:
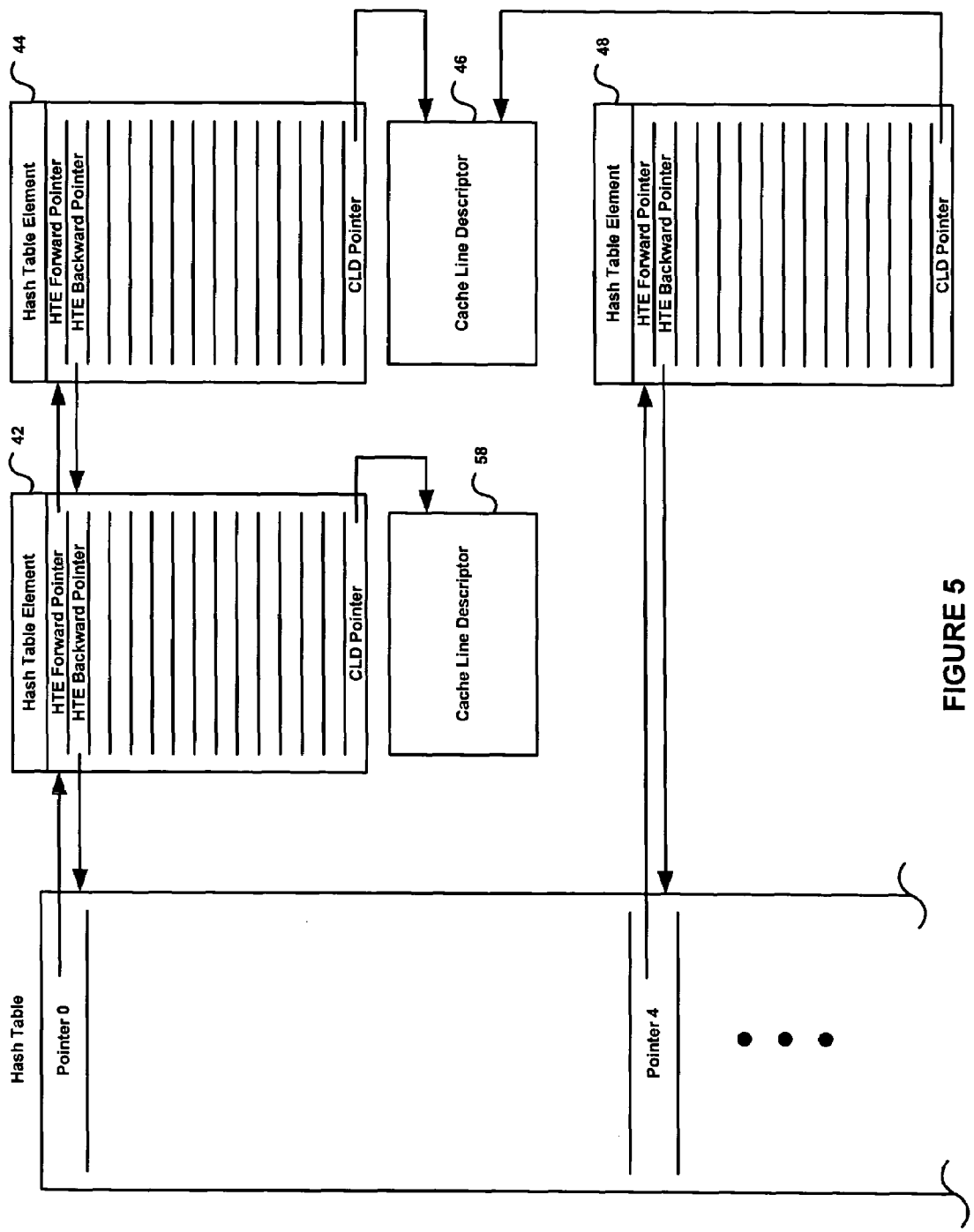
FIG. 5 illustrates hash table pointers that point to linked lists of hash table elements and associated cache line descriptors.

FIG. 5 illustrates hash table pointers that point to two linked lists of HTEs. Pointer 0—> HTE 42 in a doubly-linked list of HTEs. The pointer 0 and HTE 42 and HTE 44 form a hash line, referred to as hash line 0. The HTE forward pointer of HTE 42—> HTE 44, i.e., the next HTE that was allocated in hash line 0. In this illustration, the system has not allocated other HTEs in hash line 0. As a result, the HTE forward pointer of HTE 44 in hash line 0 does not point forward to another HTE and is said to be a null pointer. The HTE backward pointer of HTE 44 points back to HTE 42 in hash line 0. The HTE backward pointer of HTE 42 —> pointer 0. HTE 42—> CLD 58 and HTE 44—> CLD 46 with their respective CLD pointers. Similarly, hash line 4 is made up of pointer 4 and HTE 48. HTE 48 uses its CLD pointer to point to CLD 46 as does HTE 44 in hash line 0.

Figure 6:
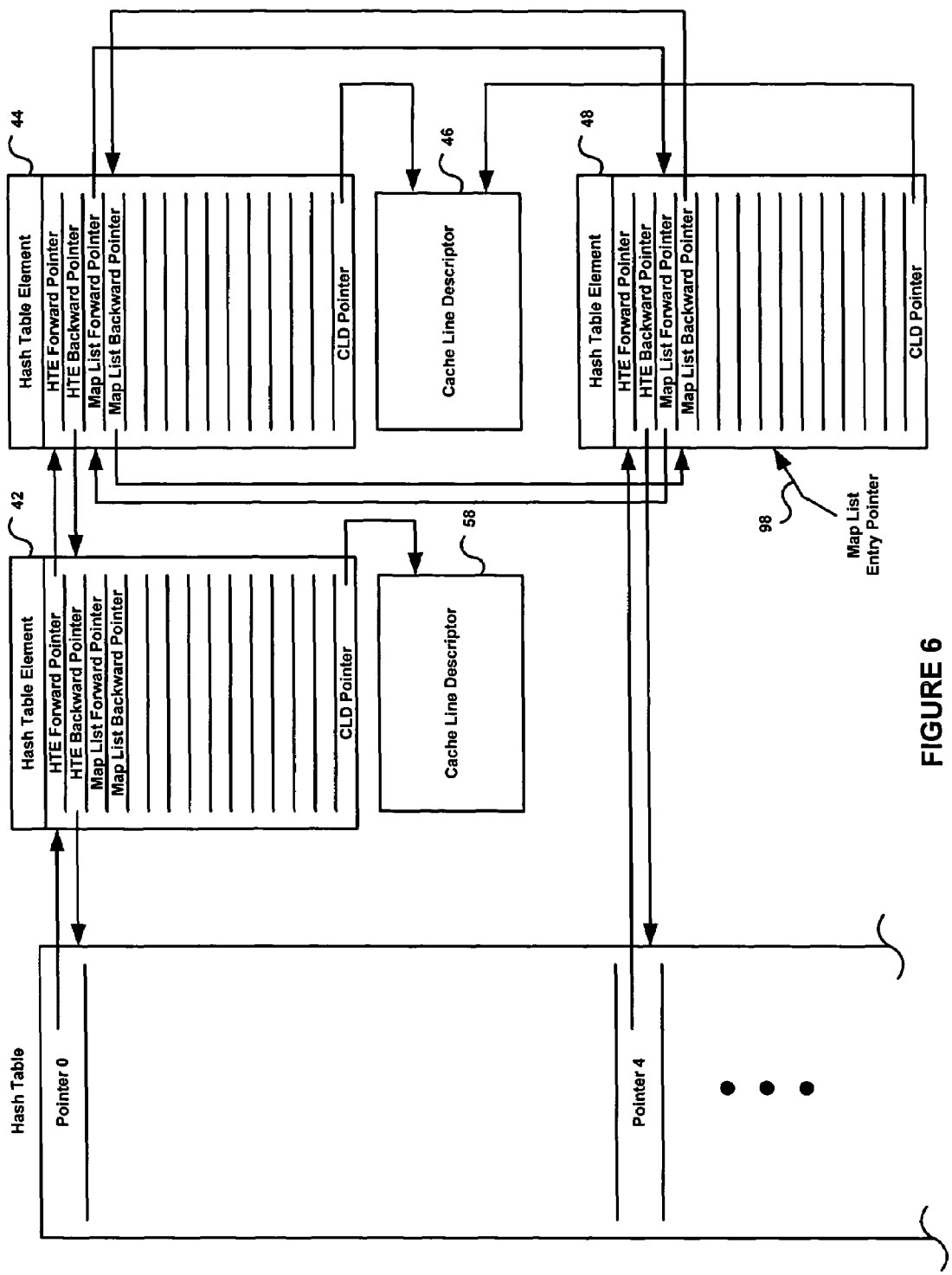
FIG. 6 illustrates a linked list of hash table elements that point to the same cache line descriptor through the use of map list pointers and cache line descriptor pointers.

FIG. 6 illustrates a linked list of hash table elements pointing to the same cache line descriptor. This linked list of HTEs is made up of HTE 44 from hash line 0 and the HTE 48 of hash line 4. The map list forward pointer of HTE 44—> HTE 48. Since there are only two HTEs that point to the same CLD 46, the map list forward pointer of HTE 48—> HTE 44. The map list backward pointer of HTE 48—> HTE 44. The map list backward pointer of HTE 44—> HTE 48.

Also shown is a map list entry pointer 98 that permits the system to directly access this linked list without needing to search through hash table elements that do not point to CLD 46.

As a new HTE (not shown) is allocated that points to the same CLD 46, a pair of existing HTE forward and backward pointers are redirected to point to the new HTE. For example, the map list forward pointer of HTE 44—> new HTE. The map list forward pointer of the new HTE—> HTE 48. Similarly, the map list backward pointer of HTE 48—> new HTE. The map list backward pointer of new HTE—> HTE 44. Thus, the new HTE's forward and backward pointers will take the place of the redirected pointers in the linked list.

Figure 7:
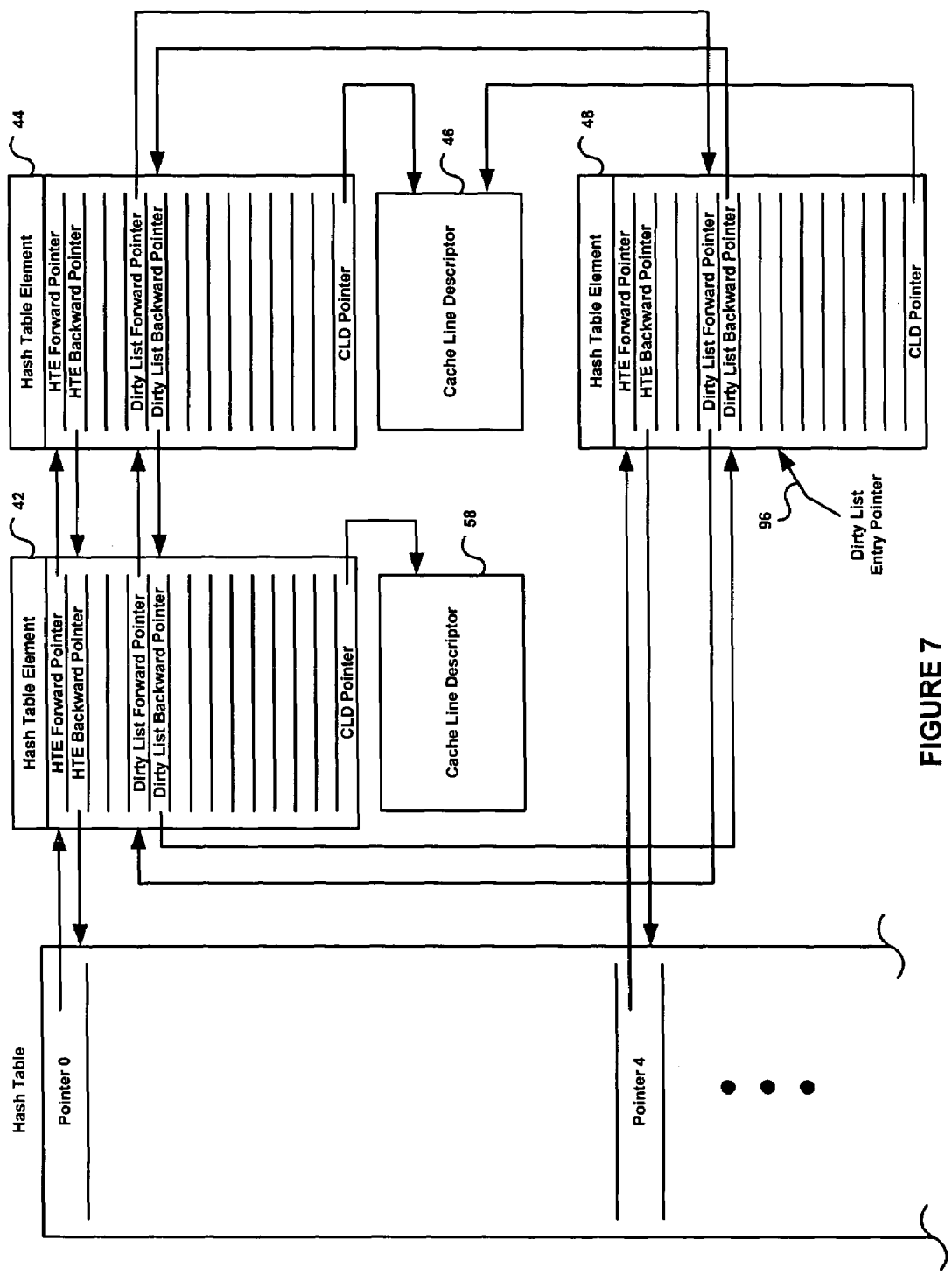
FIG. 7 illustrates a linked list of hash table elements whose associated cache lines contain data requiring destaging.

FIG. 7 illustrates a linked list of HTEs whose associated cache lines contain data requiring destaging, that is, dirty data. It is assumed that HTE 42, HTE 44, and HTE 48 are associated with dirty data in their respective cache lines. The dirty list forward pointer of HTE 42—> HTE 44. The dirty list forward pointer of HTE 44—> HTE 48. The dirty list forward pointer of HTE 48—> HTE 42. The dirty list backward pointer of HTE 42—> HTE 48. The dirty list backward pointer of HTE 48—> HTE 44. The dirty list backward pointer of HTE 44—> HTE 42.

In order to speed the access to the linked list of HTEs associated with dirty data, a dirty list entry pointer 96 is maintained in the cache directory as dirty data are created. This pointer eliminates the need to search through HTEs that are not associated with dirty data.

If a new HTE (not shown) is allocated that is associated with dirty data, a pair of existing HTE forward and backward pointers are redirected to point to the new HTE. For example, the dirty list forward pointer of HTE 42—> new HTE. The dirty list forward pointer of the new HTE—> HTE 44. The dirty list forward pointer of HTE 44—> HTE 48. The dirty list forward pointer of HTE 48—> HTE 42. Similarly, the dirty list backward pointer of HTE 42—> HTE 48. The dirty list backward pointer of HTE 48—> HTE 44. The dirty list backward pointer of HTE 44—> new HTE. The dirty list backward pointer of the new HTE—> HTE 42. Thus, the new HTE's forward and backward pointers will take the place of the redirected pointers in the linked list.

Figure 8:
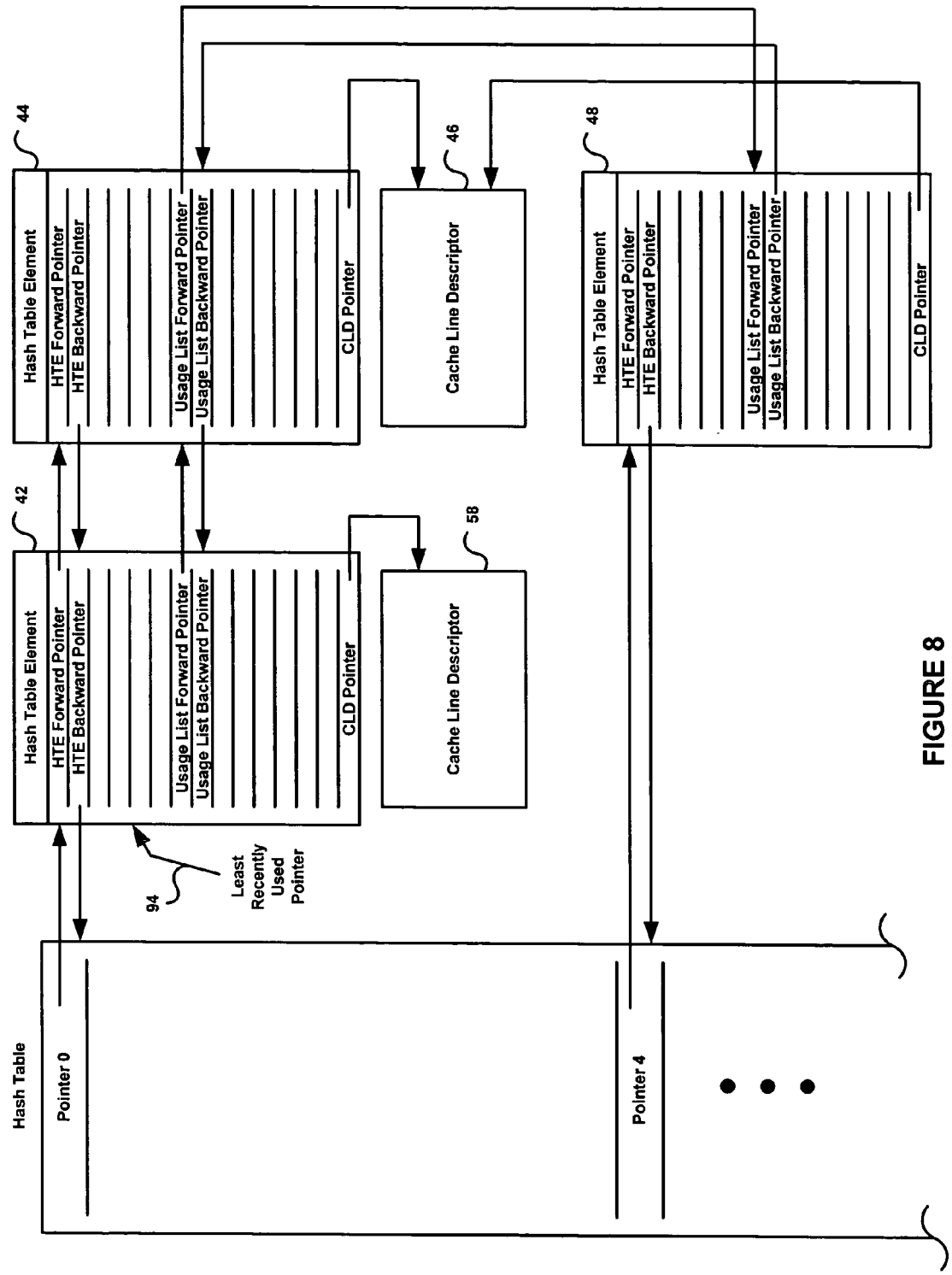
FIG. 8 illustrates a linked list of hash table elements that include usage list pointers that identify the least-recently-used (LRU) hash table element.

FIG. 8 illustrates a linked list of HTEs that include the usage list pointers that identify least-recently-used data. A least-recently used pointer 94 is maintained in the cache directory that points to the least-recently-used HTE. Conventional algorithms can be employed to determine which HTEs may be de-allocated in order to free cache space for other applications requesting data. For example, a time stamp may be appended to each HTE to indicate the length of time that the data has resided in cache memory. In another example, the rate at which an HTE is accessed is maintained as an indication of the frequency of usage of the associated data. In any case, the HTEs are ranked and maintained in order of least-recently-used pointer to most-recently-used and linked through the redirection of usage list forward and usage list backward pointers. One or more HTEs can be inserted into or deleted from the linked list to maintain the order of least-recently-used pointer to most-recently-used. The least-recently-used pointer 94—> HTE 42. The usage list forward pointer of HTE 42—> HTE 44. The usage list forward pointer of HTE 44—> HTE 48. The usage list forward pointer of HTE 48 is a null pointer. Similarly, the usage list backward pointer of HTE 48—> HTE 44. The usage list backward pointer of HTE 44—> HTE 42. The usage list backward pointer of HTE 42—> pointer 0 in the hash table.

Figure 9:
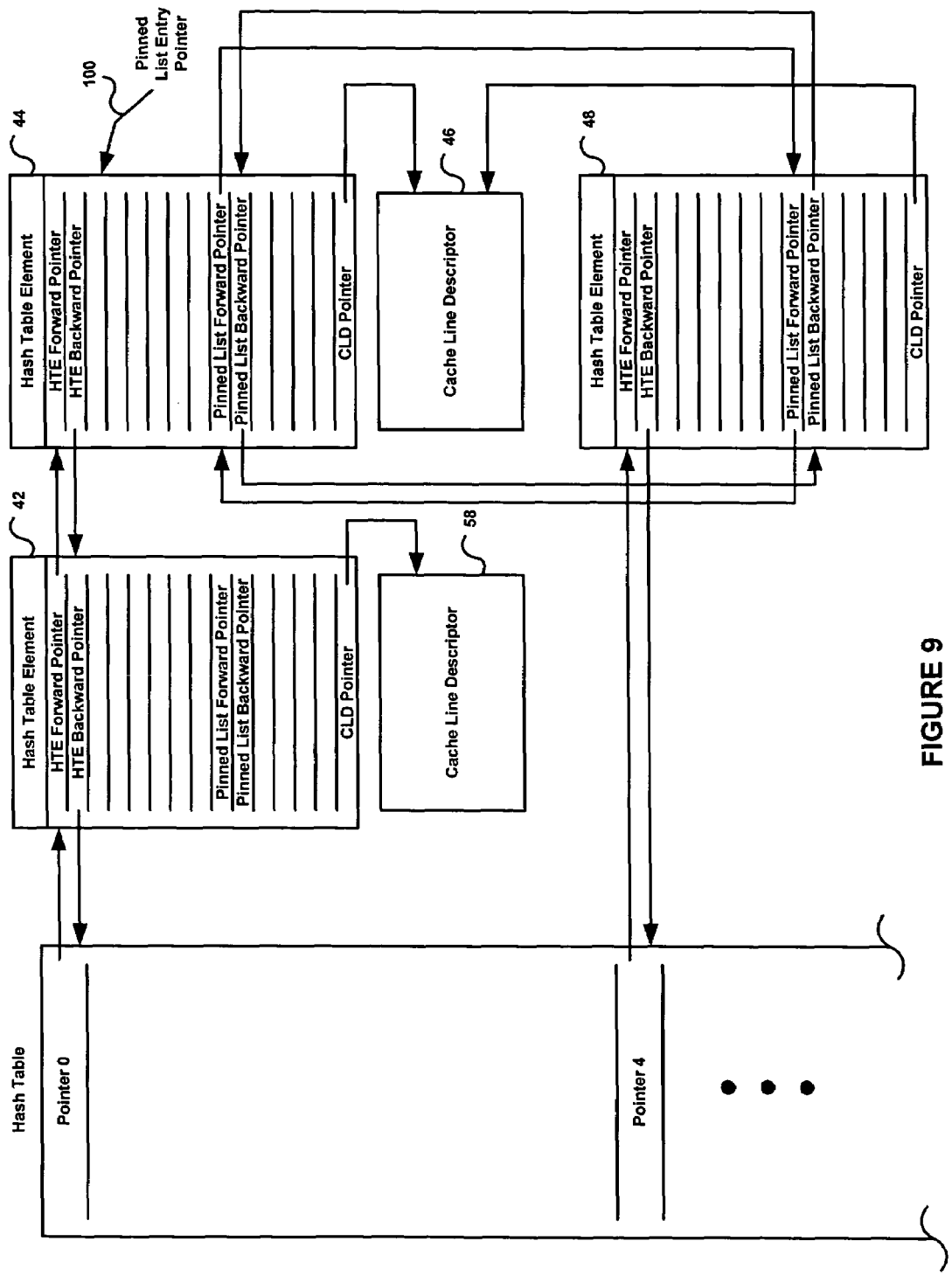
FIG. 9 illustrates a linked list of hash table elements that include pinned list pointers that indicate associated cache lines that contain data that need to be destaged but whose VLUNs are unavailable.

FIG. 9 illustrates a linked list of HTEs for pinned data, that is, HTEs having dirty data that cannot be destaged because the associated VLUNs are unavailable. Let's assume that only CLD 46, pointed to by HTE 44 and HTE 48, has pinned data. The pinned list forward pointer of HTE 44—> HTE 48. The pinned list forward pointer of HTE 48—> HTE 44. The pinned list backward pointer of HTE 48—> HTE 44. The pinned list backward pointer of HTE 44—> HTE 48.

As a further example, as a new HTE (not shown) is allocated that associates with pinned data, a pair of existing HTE forward and backward pointers from HTEs in this linked list are redirected to point to the new HTE as described earlier in connection with FIG. 6. The new HTE's forward and backward pointers will take the place of the redirected pointers in the linked list. Also shown is a pinned list entry pointer 100 that permits the cache memory management system to directly access this linked list without the need to search through hash table elements that are not associated with pinned data.

Figure 10:
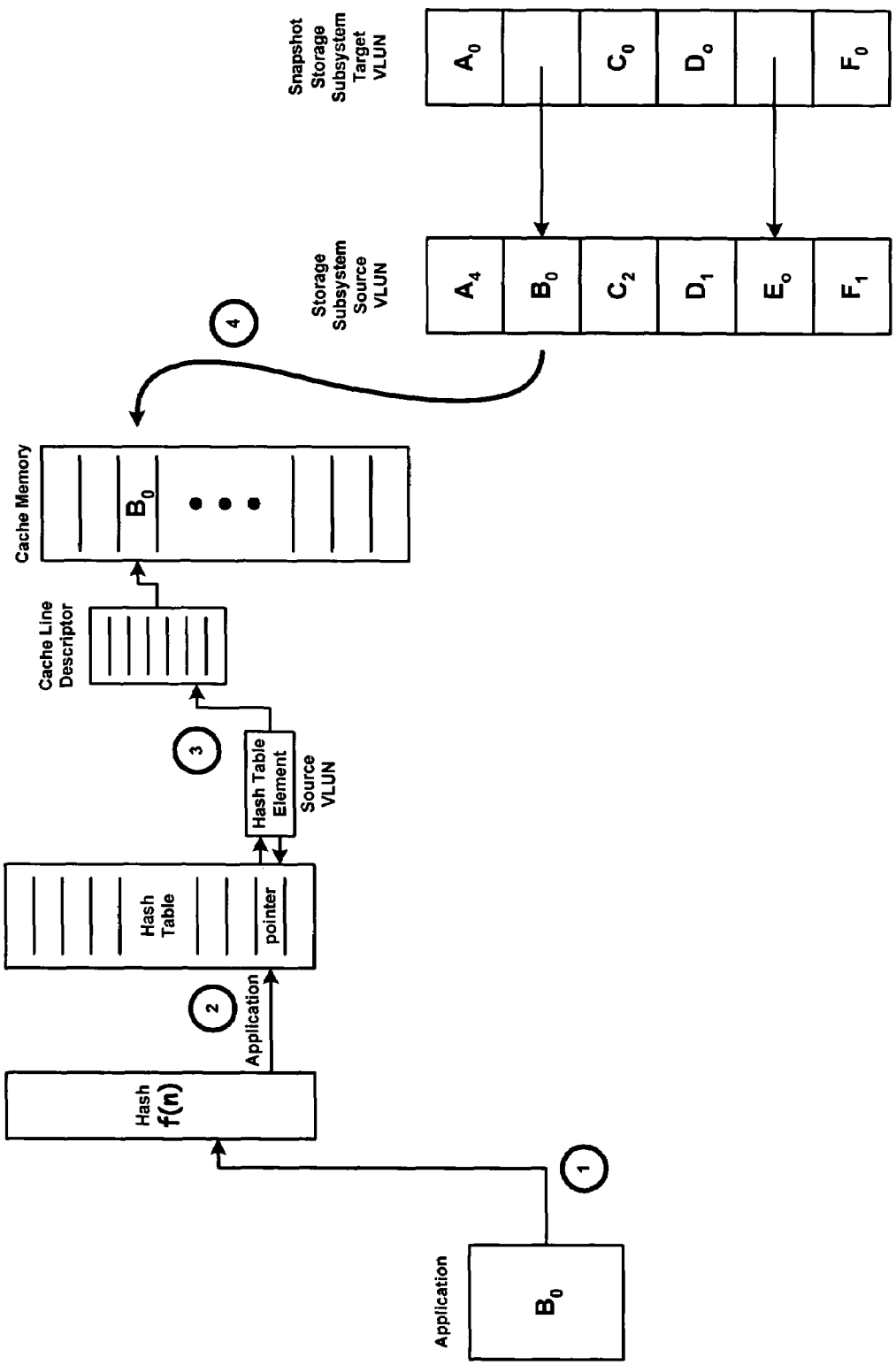
FIG. 10 illustrates an embodiment of a data storage system with a snapshot VLUN and a request for data from an application where the data does not initially reside in cache memory and must be staged from a source VLUN.
Figure 11:
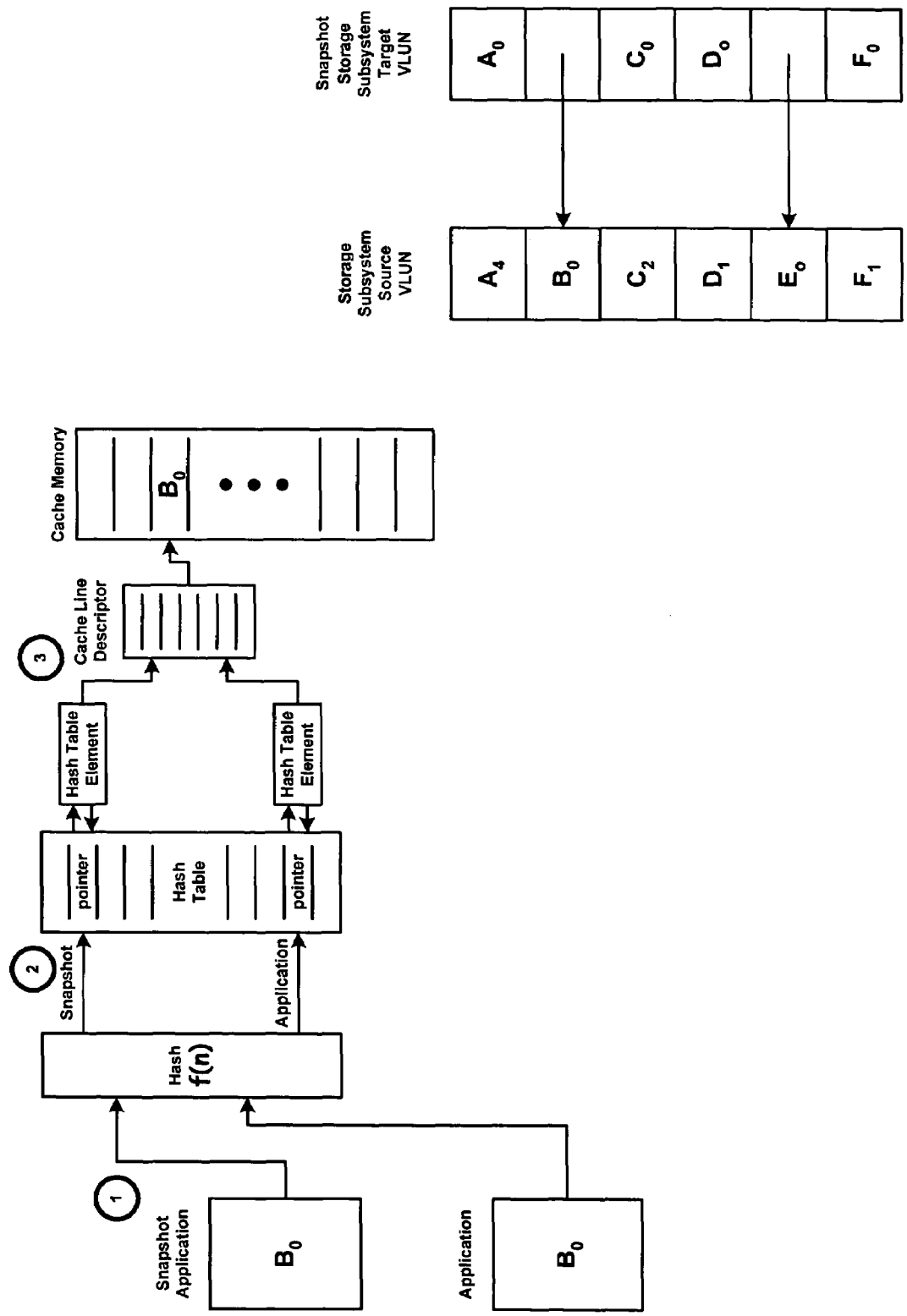
FIG. 11 illustrates an embodiment of the data storage system at a later time where a snapshot application and primary application point to the same data $B_0$ in cache memory and the associated VLUNs.
Figure 12:
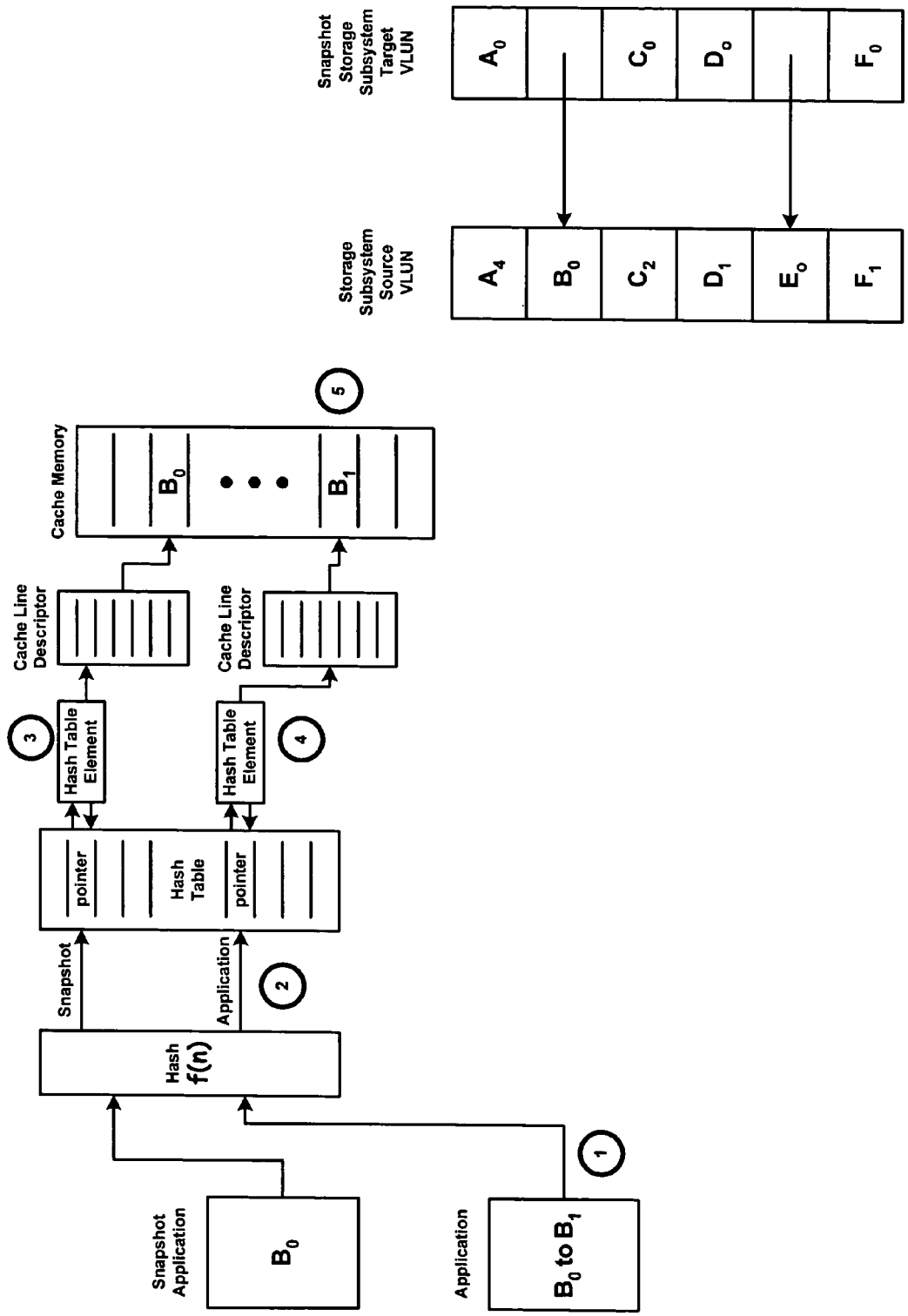
FIG. 12 illustrates an embodiment of the data storage system where the application writes updated data to cache.

FIGS. 10-12 illustrate a data storage system with a snapshot. It shows how the system handles requests for data not in cache, operates on data in cache, writes updated data to cache, and destages the original and updated data to the VLUNs.

FIG. 10 illustrates an embodiment of a data storage system with a snapshot VLUN and a request for data from an application (e.g., a user application) where the data does not initially reside in cache memory and must be staged from the source VLUN. At step 1, the application requests data $B_0$. The system turns this request into an input to a hashing function f(n). At step 2, the system outputs an address to the hash table. The system determines that the data $B_0$ is not in cache memory, that is, a cache miss. Thus, at step 3, the system allocates an HTE and a CLD that associates with an available cache line in the cache memory. At step 4, the system stages data $B_0$ from the storage subsystem source VLUN to the allocated cache line without changing the snapshot data in the target VLUN.

FIG. 11 illustrates a snapshot operation and the associated VLUNs where a snapshot application and the application operate on the same data $B_0$ in cache memory. At step 1, the snapshot application provides an input to the hashing function f(n). At step 2, the system outputs an address to the hash table. The system determines that the data $B_0$ is in cache memory, that is, a cache hit. Thus, at step 3, the system allocates a new HTE for the snapshot application that points to the same CLD pointing to the same cache line containing the data $B_0$ in the cache memory. Thus, the system converts multiple data requests for the same data from multiple applications, into pointers to the same cache line descriptor pointing to the same cache line.

FIG. 12 illustrates an embodiment of the snapshot operation where the application initiates an update to the data in cache. At step 1, the application initiates an update to the data $B_0$, that is, $B_0$ to $B_1$. The system turns this into a new input to the hashing function f(n). At step 2, the system outputs a new address to the hash table. At step 3, the system will modify the snapshot HTE's VLUN identifier to address the target VLUN for $B_0$. At step 4, the system will allocate a new HTE for the source VLUN and a new CLD to reserve an available cache line for the new data $B_1$. At step 5, the application updates the original data $B_0$, that is, $B_0$ to $B_1$, and the system writes the new data $B_1$ into the allocated cache line. The system does not change the snapshot data in the target VLUN.

Figure 13:
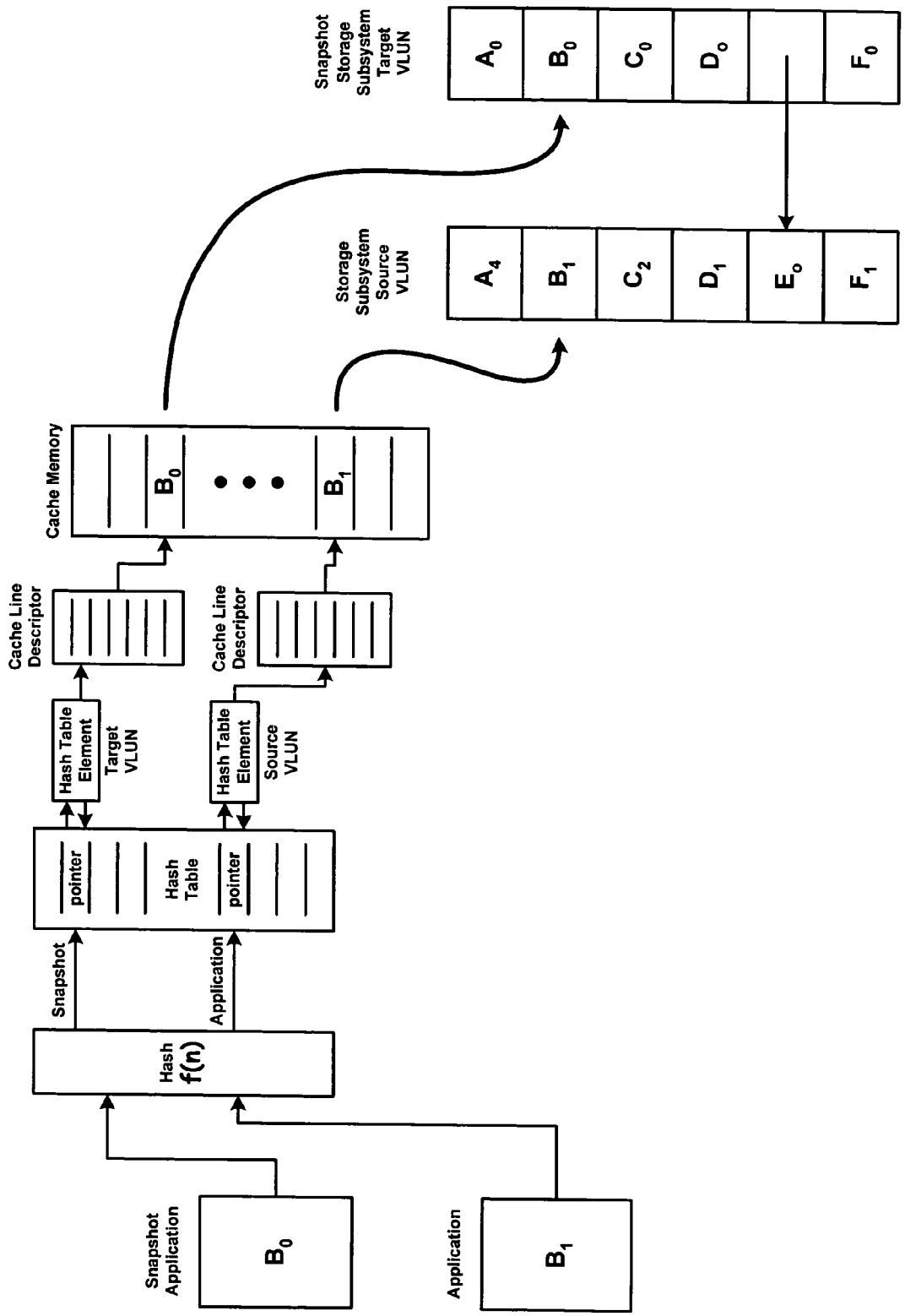
FIG. 13 illustrates an embodiment of the data storage system where the original data is destaged from cache memory to the target VLUN and the updated data is destaged from cache memory to the source VLUN.

FIG. 13 illustrates an embodiment of the data storage system where the data is destaged from cache memory to the source VLUN and target VLUN. The update $B_0$ to $B_1$ was the first change to the original image of the data $B_0$. In order to preserve this image, $B_0$ is destaged to the target VLUN and the $B_0$ pointer from the target VLUN to the source VLUN is removed. FIG. 13 also illustrates that the updated data $B_1$ is destaged from the cache memory to the source VLUN to maintain data consistency. In an embodiment, the destaging of data $B_0$ precedes the destaging of data $B_1$. In another embodiment, the destaging of data $B_1$ precedes the destaging of data $B_0$. The destaging of $B_0$ occurs independently from the $B_1$ write operation.

The present invention was primarily described as using a hashing function to locate the pointers in a hash table to point to hash table elements and in turn cache line descriptors associated with cache lines in a cache memory. However, the present invention is not limited to searching for hash table elements in this manner only. The invention also encompasses a cache memory management system in a data storage system that includes a cache directory including search elements and cache line descriptors, a cache manager that receives a request for data from an application and uses search algorithms to locate the search element, wherein the search element points to a first cache line descriptor that has a one-to-one association with a first cache line. Cormen, *Introduction to Algorithms* (2001) and Knuth, *The Art of Computer Programming*, Volume 3, Sorting and Searching (1998) describe suitable algorithms and data structures and are hereby incorporated herein by reference.

The invention provides host and data storage subsystem cache structures that support efficient random and sequential data access in a RAID-5 data storage system. These structures remove the need for different RAID-5 stripe geometries to support different workloads.

In data storage systems, the SAN protocol supports host I/O in units of one or more 512-byte blocks. The NAS protocols implement a file system, preferably with fixed 4K or 8K blocks. The disk drives in the data storage subsystems also support I/O's in units of 512-byte blocks.

The hosts may use Fibre Channel to connect to the data storage subsystems. Each Fibre Channel protocol read or write command includes a count of 512-byte blocks to transfer, the LBA of storage to read or write and one or more addresses in host memory to transfer the data. The host memory addresses are called the scatter-gather list. A data storage system imposes an upper limit to the number of scatter-gather list elements in an I/O request. A data storage system should keep scatter-gather lists reasonably small— say 32 elements—to avoid wasting memory and to reduce the overhead of fetching larger scatter gather lists by the Fibre Channel protocol chips.

A scatter gather list specifies the data buffers to be used for a transfer. A scatter gather list consists of one or more elements, each of which describes the location and size of one data buffer.

Fibre Channel protocol chips have internal processing overhead for each I/O command and limits on the rate of I/O commands they can process. For example, each of the Fibre Channel ports of the QLogic 2312 chip can initiate ("initiator mode") about 40,000 I/O commands per second and can receive ("target mode") about 25,000 I/O commands per second per channel. Due to these limits and the limits on reasonable scatter-gather lists, the data storage system should keep data in the cache in reasonably large contiguous pieces to support sequential workloads.

Since caches improve performance with the use of higher-cost memory, the data storage system needs to keep the memory overhead of cached data as low as possible. In combination with the needs of sequential workloads described above, these requirements dictate keeping cached data in relatively large contiguous chunks (i.e., cache lines) in memory with description and control information maintained per cache line. The description and control information provides the identity of the data, LRU information for cache content management, and so on.

The cache lines in the host are organized to find full stripes together. In an embodiment, the dirty lines in the cache are organized in an AVL tree (height balanced binary search tree named for its inventors, G. M. Adelson-Velsky and E. M. Landis) with a separate binary tree for each VLUN. The AVL tree allows efficient insertion/deletion of dirty cache lines into the list while maintaining them in disk address order. Knuth, The Art of Computer Programming, Volume 3—*Sorting and Searching* (2d Ed. 1998), which is incorporated by reference, describes balanced trees and AVL trees in section 6.2.3.

In another embodiment, the dirty lines in the cache are organized using a red-black tree for each VLUN. Cormen, *Introduction to Algorithms* (2d Ed. 2002), which is incorporated by reference, describes binary search trees and red-black trees in chapters 12-13, respectively.

With that detail described, we turn to describing methods for accepting a write to a block and destaging data for a full stripe.

RAID-5 storage imposes an additional requirement on the cache organization. Random writes to RAID-5 storage require reading the old data and parity blocks, performing an XOR computation, and writing the new data and parity blocks.

Sequential workloads that write large amounts of data at a time allow a more efficient write algorithm called a full stripe write in which the host writes all the data in a stripe at once. In a full stripe write, the RAID controller computes the parity from the new data and does not need to read the old data or parity. The cache structure efficiently recognizes writes that the host can present to the RAID-5 storage as full stripe writes.

Non-sequential workloads do not write full stripes but still benefit from the host writing all the data available for partial stripes at once. The RAID controller can use the contents of the partial stripe to reduce the number of blocks read from the disk for the parity computation.

Usually, data storage systems operate their cache in write-back mode. This means that the cache accepts a write, makes the write data safe from failures, and indicates completion of the write independently of the actual write of the data to disk. Write-back mode enables the data storage systems to acknowledge writes quickly and gives the cache the opportunity to accumulate write data for efficient writing to disk. The process of writing modified data to disk from cache is called destaging.

The host may have a cache size, e.g., of between 1 and 8 gigabytes, depending on the host memory configuration, while the data storage subsystems have a smaller cache size, for example, 100 megabytes.

Both the host and the data storage subsystem use caches with the same structure. However, data storage subsystem cache uses smaller parameters to accommodate the smaller memory size. The data storage subsystem cache may provide volatile cache only.

Each cache contains fixed size cache lines made up of 512-byte blocks. Each cache line contains contiguous blocks aligned on the cache line size plus a cache line descriptor that provides the disk address of the first block in the cache line, a bitmap indicating which blocks contain valid data, a bitmap indicating which blocks contain modified data, and other information to support LRU management and hash lookup as described earlier.

Large cache lines decrease the percentage of memory needed for the cache line descriptors and allow sequential reads and writes to use a small number of scatter-gather list elements and thus few read/write commands.

On the other hand, large cache lines consume more memory than small cache lines for workloads that access small blocks over a large region. In the host, the large memory allocated to cache and the limitations on scatter/gather list elements lead to a large cache line size (e.g., 64 KB). In the data storage subsystem, the small memory allocated to cache leads to a smaller cache line size (e.g., 16 KB).

Figure 14:
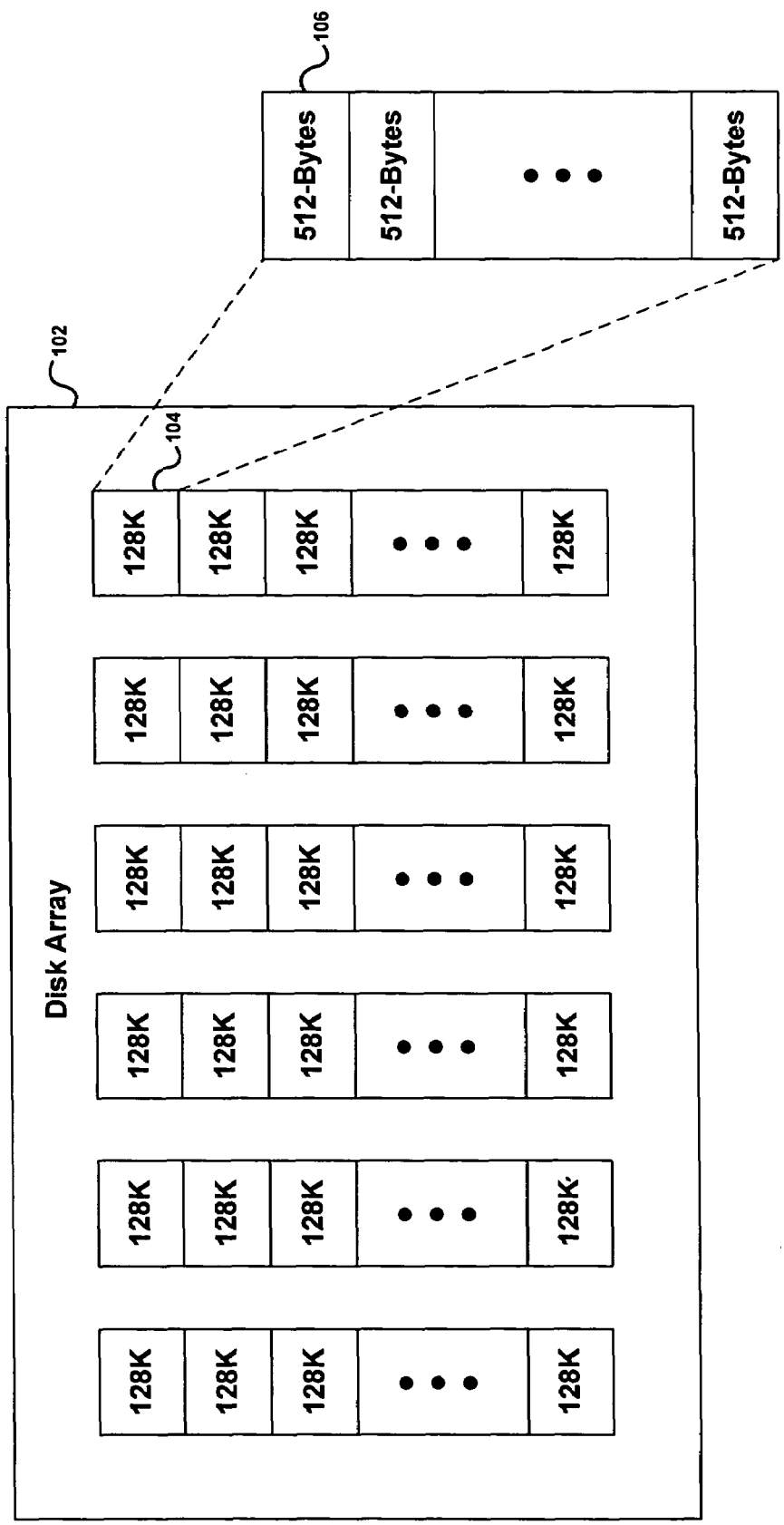
FIG. 14 illustrates a data storage subsystem stripe layout.

FIG. 14 illustrates a data storage subsystem stripe layout. In an embodiment, the disk array 102 uses a fixed five data disk+one parity disk organization with 128 KB strips (e.g., strip 104). The data storage subsystem rotates data and parity on the 128 KB strip boundaries. 128 KB for the strip size provides an intermediate size for a full stripe: 640 KB. The stripe size needs to be small enough that applications can easily allocate contiguous space to achieve full stripe writes and large enough for good Fibre Channel and disk performance. As illustrated in FIG. 14, each 128K strip is a multiple of 512 byte blocks (e.g., block 106).

Figure 15:
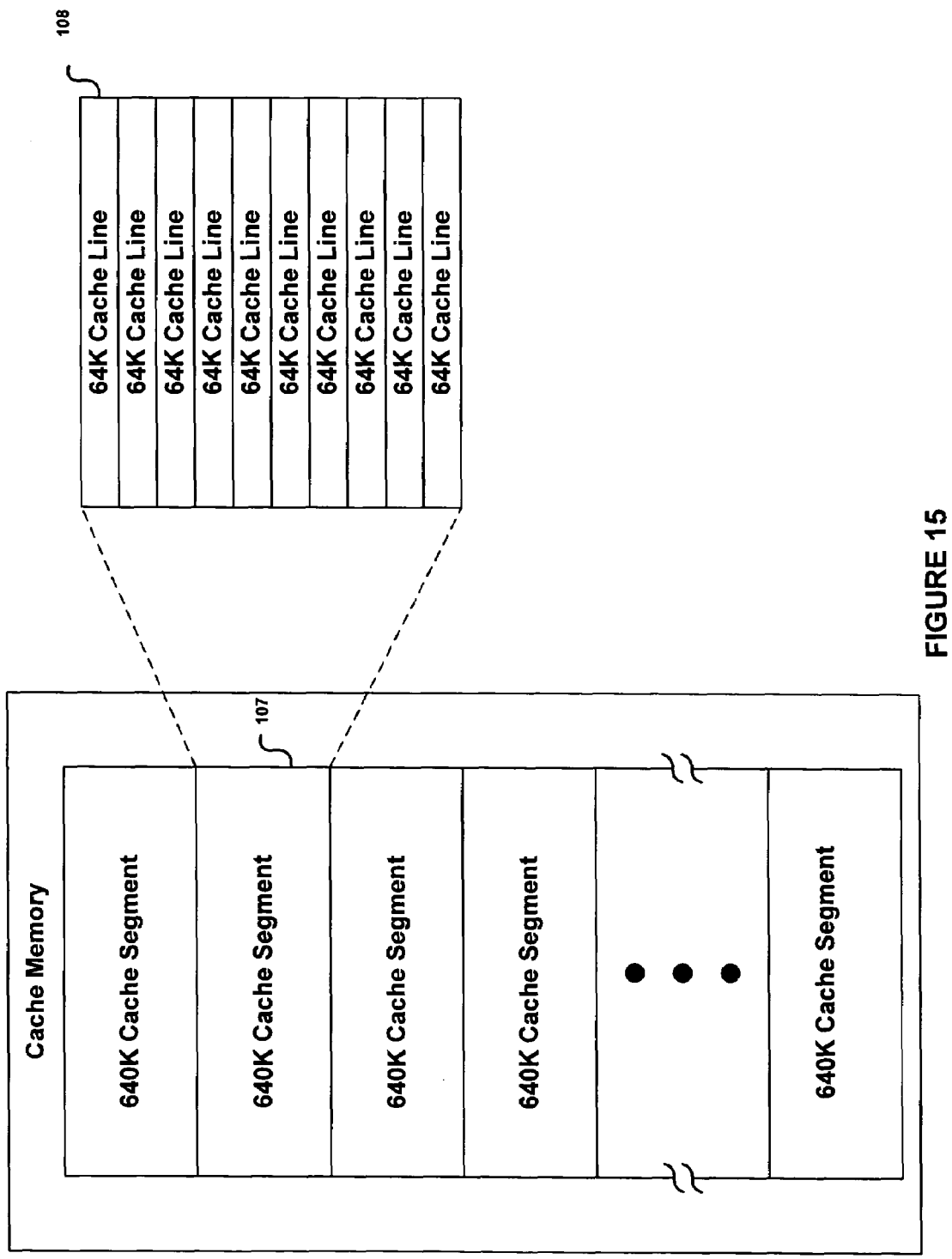
FIG. 15 illustrates a host cache line layout.

FIG. 15 illustrates a host cache line layout. The host cache uses 64K cache lines (e.g., cache line 108). This unit of allocation results in 16,000 usable cache pages for each GB of memory managed and requires 10 scatter-gather elements to express a full-stripe write where the 64K cache lines are noncontiguous. Alternatively, the host cache can use smaller cache pages to reduce internal fragmentation. For example, the host cache could use 16 KB cache lines and expand the maximum scatter-gather elements to 40.

The host cache handles arbitrary-sized block accesses efficiently using the cache line descriptor bitmaps (FIG. 19) to indicate the presence of valid data within a cache line. The host transfers just the data needed from the data storage subsystem to satisfy a read or write request. For example, when the host receives a request to read a single 512-byte block, the host retrieves just the 512-byte block from the data storage subsystem and stores it in a cache line. In order to allow the data storage subsystem the maximum opportunity to optimize the write path and reduce the number of I/Os required to the drives, the host cache preferably performs destages on a 640K cache segment basis (e.g., cache segment 107). All modified data within the cache segment will be destaged at the same time using the minimum possible write commands. Using an extension to the SCSI write command, the host indicates the bounds of all the writes to a 640 KB segment. By managing destages in this manner, the data storage subsystem can optimize for either sequential or random I/O access patterns.

In the SCSI command format, the host can represent up to 255 write commands to the data storage subsystem. In the worst case, it could take 640 write commands to destage a segment. In such case, the host will have to destage a segment in multiple groups to the data storage subsystem.

In a sequential write I/O operation, the host can destage the entire 640K segment with a single write command that has ten scatter-gather elements. Random I/O's take multiple write commands to destage the data.

As an additional optimization, the host cache can also destage clean data contained within the segment being destaged if the clean data helps in parity calculations. To support the transferring of both clean data and modified data to the data storage subsystem, a bit will be utilized in the write command to indicate which type is contained in the command. See the write command definition below for further details.

In an embodiment, the host transfers modified data and clean data in separate commands. In an alternate embodiment, the host sends a bitmap indicating which blocks contained modified data and sends modified and clean data in a single command.

The host normally reads only the data actually requested by a client from the data storage subsystems. However, once a disk has read a sector, it can read neighboring sectors at low cost. To take advantage the data storage subsystem can optionally prestage data from the disk using one of two techniques.

In the first technique, the data storage subsystem prestages data into its cache on request, but returns only the client demanded data. The host indicates that the data storage subsystem should prestage by setting a prestage bit in the SCSI Read command. This bit indicates that the data storage subsystem should transfer the requested data to the host and then continue prestaging the remainder of the current 128K stripe into the data storage subsystem cache. The data storage subsystem cache retains only the data that has not been transferred to the host.

In a second technique of prestaging, the host uses the SCSI prefetch command to instruct the data storage subsystem to have the data prefetched into the data storage subsystem cache for later access. The host may use the SCSI prefetch command due to policy configuration or due to automatic detection of a sequential I/O pattern.

The host can also read the client-requested data along with additional data for prestage into the host cache. This technique has the advantage that the host can quickly satisfy requests for prestaged data, but uses host cache and Fibre Channel bandwidth for data that might not be used.

In order to implement the algorithms described earlier, the data storage subsystem supports the following modified SCSI read command shown in FIG. 16. As shown, the 16-byte SCSI read command supports a prestage bit. If the prestage bit is not set, the read command operates normally. If the prestage bit is set, it indicates that the data storage subsystem should transfer the data requested by the command to the host and then prestage the remaining portion of the 128K stripe into the data storage subsystem cache.

The data storage subsystem also supports the following modified SCSI prefetch command shown in FIG. 17. As shown, no system unique modification is required for the 16-byte SCSI prefetch command. When the host uses the command, the immediate bit should always be set (e.g., immediate=1). This indicates that the data storage subsystem should just validate the command parameters and then immediately return status. The data storage subsystem will then prestage the requested data into its local cache when possible. The data storage subsystem considers the prefetch command to be a hint and does not prioritize it above other requests.

The data storage subsystem also supports the following modified SCSI write command shown in FIG. 18. As shown, there are two modifications required to the standard 16-byte SCSI write command. The first modification is to support the clean bit. If the clean bit is not set, the write command operates normally, that is the data transferred by the command is modified and must be destaged to the media. If the clean bit is set, it indicates that the data transferred by the command is not modified, it may be used by the data storage subsystem to assist in RAID 5 parity calculations but should not be destaged to media.

If the clean bit is set, the data storage subsystem must not write this data on the media as failure scenarios may result in data loss. The host can not re-present clean data after failures.

The host sends clean data when the data storage subsystem can use the clean data to avoid reading from the disk for parity calculations.

The second modification supports the commands in group field of the SCSI write command. This field indicates the number of write commands being destaged by the host for this 640 KB RAID stripe. The data storage subsystem uses commands in group to determine when the host has completed destaging data for a particular 640K segment and that the data storage subsystem should now begin executing its destage algorithms on this segment. Each write command sent for the destage operation (including both modified and clean data) presents the same commands in group value. Presenting a counter on each command alleviates ordering problems due to the commands using different paths or retry operations. The data storage subsystem does not begin destaging the data for the segment until all commands expected have been received or a reasonable time out has expired.

Since the commands in the group counter may fit in 8-bits, we can represent a destage group of up to 255 write commands. For those destages that require more than 255 write commands, the host destages the 640 KB segment in multiple groups.

Figure 19:
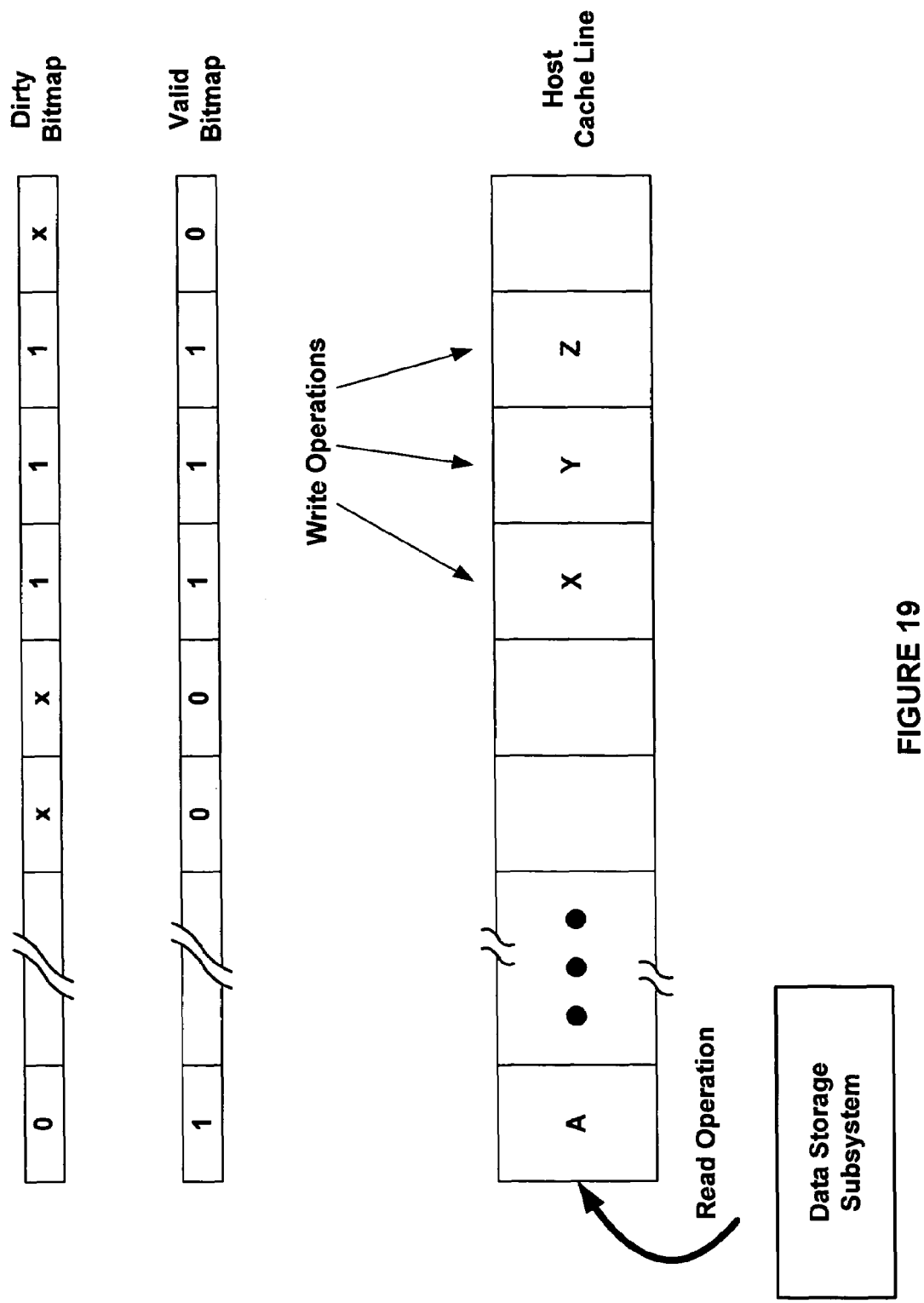
FIG. 19 illustrates operations of cache descriptor bitmaps, a host cache line, and a data storage subsystem.

FIG. 19 illustrates that the data storage system uses cache descriptor bit maps to manage the cache lines in the host. The valid bitmap indicates the corresponding memory locations in the cache line that contain valid data such as writes (e.g., X, Y, and Z) and the staged data (e.g., A). The dirty bitmap indicates the writes (e.g., X, Y, and Z) that have been written to the cache line but not to the data storage subsystem.

What is claimed is:

1. A method of destaging data in a stripe in a data storage system, comprising:

receiving a plurality of write commands in a data storage subsystem;

setting a dirty bit for each block of each write in a cache line in a host;

setting a valid bit for each block of each write in the cache line in the host;

locating all of the cache line descriptors for the stripe in the host;

writing the data in the stripe to the data storage subsystem;

acknowledging the data in the stripe is written to the data storage subsystem;

clearing the dirty bits in the host;

removing the cache line descriptors in the host; and writing clean data from the cache line of the host to the cache of the data storage subsystem to perform a parity computation.

2. A method of destaging data in a stripe in a data storage system, comprising:
   receiving a plurality of write commands in a data storage subsystem;
   setting a dirty bit for each block of each write in a cache line in a host;
   setting a valid bit for each block of each write in the cache line in the host;
   locating all of the cache line descriptors for the stripe in the host;
   writing the data in the stripe to the data storage subsystem;
   acknowledging the data in the stripe is written to the data storage subsystem;
   clearing the dirty bits in the host; and
   removing the cache line descriptors in the host, wherein each of the write commands includes a commands in group field that identifies the writes in the same stripe.

3. The method of claim 2, further comprising writing clean data to the cache of the data storage subsystem for performing a parity computation.

* * * * *